United States Patent
Xu et al.

(10) Patent No.: US 12,231,964 B2
(45) Date of Patent: *Feb. 18, 2025

(54) APPARATUS AND METHOD FOR SUPPORTING HANDOVER IN A WIRELESS COMMUNICATION SYSTEM

(71) Applicant: Samsung Electronics Co., Ltd., Suwon-si (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

This patent is subject to a terminal disclaimer.

(21) Appl. No.: 18/330,744

(22) Filed: Jun. 7, 2023

(65) Prior Publication Data

US 2023/0354108 A1    Nov. 2, 2023

Related U.S. Application Data

(63) Continuation of application No. 17/503,863, filed on Oct. 18, 2021, now Pat. No. 11,722,933, which is a
(Continued)

(30) Foreign Application Priority Data

May 5, 2017  (CN) .......................... 201710313665.1
May 10, 2017  (CN) .......................... 201710327037.9
(Continued)

(51) Int. Cl.
*H04W 36/00* (2009.01)
*H04W 36/02* (2009.01)
*H04W 36/08* (2009.01)

(52) U.S. Cl.
CPC .... *H04W 36/0016* (2013.01); *H04W 36/0011* (2013.01); *H04W 36/0033* (2013.01);
(Continued)

(58) Field of Classification Search
CPC ......... H04W 36/0016; H04W 36/0064; H04W 36/0011; H04W 36/0033
See application file for complete search history.

(56) References Cited

U.S. PATENT DOCUMENTS 9,967,781 B2    5/2018  Xu et al.
11,153,787 B2 * 10/2021  Xu .................... H04W 36/0033
(Continued)

FOREIGN PATENT DOCUMENTS

CN          102238656 A       11/2011
CN          102905329 A        1/2013
(Continued)

OTHER PUBLICATIONS

3rd Generation Partnership Project; Technical Specification Group Radio Access Network; NG-RAN; NG Application Protocol (NGAP) (Release 15), 3GPP TS 38.413 V0.7.0 (Mar. 2018).
(Continued)

*Primary Examiner* — Justin Y Lee
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present invention provides a method for supporting handover, comprising the steps of: informing, by a source base station, a core network whether a direct data forwarding path is available; deciding, by the core network, whether to use direct data forwarding or indirect data forwarding; informing, by the core network, a target base station of information
(Continued)

about the direct data forwarding or indirect data forwarding; allocating, by the target base station, data forwarding tunnel information, the target base station allocating the data forwarding tunnel information according to the received information about the direct data forwarding or indirect data forwarding; transmitting, by the target base station, the allocated data forwarding tunnel information to the core network; and informing, by the core network, the source base station of the data forwarding tunnel information. With the present invention, different data forwarding methods are supported to prevent data loss and ensure service continuity.

20 Claims, 16 Drawing Sheets

Related U.S. Application Data continuation of application No. 16/611,075, filed as application No. PCT/KR2018/005233 on May 4, 2018, now Pat. No. 11,153,787.

(30) Foreign Application Priority Data

| | | |
|---|---|---|
| May 31, 2017 | (CN) | 201710400195.2 |
| Jul. 7, 2017 | (CN) | 201710552782.3 |
| Aug. 11, 2017 | (CN) | 201710687667.7 |

(52) U.S. Cl.
CPC .. *H04W 36/0064* (2023.05); *H04W 36/00692* (2023.05); *H04W 36/0235* (2023.05); *H04W 36/085* (2023.05)

(56) References Cited

U.S. PATENT DOCUMENTS

| | | | |
|---|---|---|---|
| 2008/0171548 | A1 | 7/2008 | Tsirtsis et al. |
| 2013/0272194 | A1 | 10/2013 | Keller et al. |
| 2013/0331063 | A1 | 12/2013 | Cormier et al. |
| 2015/0264609 | A1 | 9/2015 | Zhang et al. |
| 2016/0353350 | A1 | 12/2016 | Engstrom et al. |
| 2017/0171782 | A1 | 6/2017 | Mohamed et al. |
| 2020/0120570 | A1 | 4/2020 | Youn et al. |
| 2020/0178140 | A1 | 6/2020 | Xu et al. |

FOREIGN PATENT DOCUMENTS

| | | |
|---|---|---|
| CN | 103621158 A | 3/2014 |
| CN | 105830476 A | 8/2016 |
| JP | 2014-107618 A | 6/2014 |
| WO | 2014/019554 A1 | 2/2014 |
| WO | 2016/021870 A1 | 2/2016 |

OTHER PUBLICATIONS

3rd Generation Partnership Project; Technical Specification Group Radio Access Network; NG-RAN; Xn application protocol (XnAP) (Release 15), 3GPP TS 38.423 V0.7.0 (Mar. 2018).
3rd Generation Partnership Project; Technical Specification Group Radio Access Network; NR; NR and NG-RAN Overall Description; Stage 2 (Release 15), 3GPP TS 38.300 V15.7.0 (Sep. 2019).
3rd Generation Partnership Project; Technical Specification Group Services and System Aspects; Procedures for the 5G System (5GS); Stage 2 (Release 15), 3GPP TS 23.502 V15.7.0 (Sep. 2019).
Samsung, Data Forwarding in NG Based Handover, Discussion & Decision, Athens, Greece, 26 Feb.-Mar. 2, 2018, 3GPP TSG-RAN WG3 #99, R3-181508.
Ericsson, Samsung, Data forwarding aspects for intra-system ACTIVE mobility—HO TP for XnAP, Discussions & Approval, Athens, Greece, Feb. 26-Mar. 2, 2018, 3GPP TSG-RAN WG3 Meeting #99, R3-181509 was R3-181244.
3rd Generation Partnership Project; Technical Specification Group Services and System Aspects; Study on Architecture for Next Generation System (Release 14), 3GPP TR 23.799 V14.0.0 (Dec. 2016).
CATT: "Data forwarding for HO procedure", 3GPP Draft; S2-166566, 3rd Generation Partnership Project (3GPP), Mobile Competence Centre ; 650, Route Des Lucioles ; F-06921 Sophia-Antipolis Cedex ; FRANCE 9, vol. SA WG2, No. Reno, USA; Nov. 14, 2016-Nov. 18, 2016, Nov. 14, 2016, XP051185125.
SAMSUNG: "Data Forwarding in NG Based Handover", 3GPP Draft; R3-180257, 3rd Generation Partnership Project (3GPP), Mobile Competence Centre ; 650, Route Des Lucioles ; F-06921 Sophia-Antipolis Cedex ; FRANCE 9, vol. RAN WG3, No. Sophia Antipolis, France; Jan. 22, 2018-Jan. 26, 2018 Jan. 12, 2018, XP051387257.
Extended European Search Report dated Apr. 14, 2020, issued in European Application No. 18793773.5-1212.
European Office Action dated Jan. 12, 2021, issued in European Application No. 18793773.5.
Chinese Office Action dated Mar. 23, 2021, issued in Chinese Patent Application No. 201710687667.7.
European Office Action dated May 31, 2021, issued in European Patent Application No. 18793773.5.
3GPP TS23.401 V14.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 14), Mar. 16, 2017.
3GPP TS38.300 V0.2.0, 3rd Generation Partnership Project; Technical Specification Group Radio Access Network; NG Radio Access Network; Overall Description; Stage 2 (Release 15), May 3, 2017.
Korean Office Action dated Dec. 15, 2021, issued in Korean Patent Application No. 10-2019-7036125.
3rd Generation Partnership Project; Technical Specification Group Services and System Aspects; Procedures for the 5G System; Stage 2 (Release 15), 3GPP TS 23.502 V0.3.0 (Mar. 2017), Apr. 20, 2017.
Huawei, Intra-system, Intra-RAT mobility in RRC_Connected, R3-171253, 3GPP TSG-RAN WG3 Meeting #95bis, Spokane, USA, Mar. 25, 2017.
Qualcomm Incorporated, Granularity of data forwarding in handover, R3-171100, 3GPP TSG-RAN WG3 #95bis, Spokane, Washington, USA, Mar. 24, 2017.
Korean Office Action dated Jun. 22, 2022, issued in Korean Patent Application No. 10-2019-7036125.
Korean Notice of Allowance dated Dec. 12, 2022, issued in a Korean Patent Application No. 10-2019-7036125.
Extended European Search Report dated Feb. 22, 2023, issued in a European Patent Application No. 22202355.8.
Chinese Office Action dated Apr. 27, 2023, issued in Chinese Patent Application No. 202210116538.3.
CATT, Handover consideration for 5G, S2-170254, Sa WG2 Meeting #118bis, Jan. 10, 2017.
Korean Office Action dated Nov. 14, 2023, issued in Korean Patent Application No. 10-2023-7008551.
Chinese Notice of Allowance dated Jan. 2, 2024, issued in Chinese Patent Application No. 202210116538.3.
Korean Notice of Final Rejection dated Jul. 4, 2024, issued in Korean Patent Application No. 10-2023-7008551.
Korean Notice of Patent Grant dated Sep. 27, 2024, issued in Korean Patent Application No. 10-2023-7008551.

\* cited by examiner

APPARATUS AND METHOD FOR SUPPORTING HANDOVER IN A WIRELESS COMMUNICATION SYSTEM

CROSS-REFERENCE TO RELATED APPLICATION(S)

This application is a continuation application of prior application Ser. No. 17/503,863 filed on Oct. 18, 2021, which issued as U.S. Pat. No. 11,683,729 on Jun. 20, 2023; which is a continuation application of prior application Ser. No. 16/611,075 filed on Nov. 5, 2019, which issued as U.S. Pat. No. 11,153,787 on Oct. 19, 2021; and which is a U.S. National Stage application under 35 U.S.C. § 371 of an International application number PCT/KR2018/005233 filed on May 4, 2018, which is based on and claims priority of a Chinese patent application number 201710313665.1 filed on May 5, 2017 in the Chinese Patent Office, of a Chinese patent application number 201710327037.9 filed on May 10, 2017 in the Chinese Patent Office, of a Chinese patent application number 201710400195.2 filed on May 31, 2017 in the Chinese Patent Office, of a Chinese patent application number 201710552782.3 filed on Jul. 7, 2017 in the Chinese Patent Office, of a Chinese patent application number 201710687667.7 filed on Aug. 11, 2017 in the Chinese Patent Office, the disclosure of each of which is incorporated by reference herein in its entirety.

TECHNICAL FIELD

The present application relates to a wireless communication and in particular to an apparatus and method for supporting handover in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The modern mobile communication increasingly tends to focus on multimedia services that provide users with high-rate transport. Therefore, there is a need for a handover supporting method that can avoid loss of data.

DISCLOSURE OF INVENTION

Technical Problem

An aspect of the present disclosure is to provide an apparatus and method for supporting handover in a wireless communication system.

The present disclosure can provide how to support handover according to the data forwarding method.

Another aspect of the present disclosure comprises receiving from source base station, whether a direct data forwarding path is available; determining data forwarding scheme based on the whether a direct data forwarding path is available; transmitting, to target base station, the determined data forwarding scheme; receiving from target base station allocated data forwarding tunnel information by target base station based on the data forwarding scheme; and transmitting, to source base station, the allocated data forwarding tunnel information.

Solution to Problem

A method for supporting handover, comprising the steps of:
informing, by a source base station, a core network whether a direct data forwarding path is available;
deciding, by the core network, whether to use direct data forwarding or indirect data forwarding;
informing, by the core network, a target base station of information about the direct data forwarding or indirect data forwarding;
allocating, by the target base station, data forwarding tunnel information, the target base station allocating the data forwarding tunnel information according to the received information about the direct data forwarding or indirect data forwarding;
transmitting, by the target base station, the allocated data forwarding tunnel information to the core network; and
informing, by the core network, the source base station of the data forwarding tunnel information.

According to an aspect of the invention, the method comprises:
the source base station proposes downlink data forwarding, and transmits the proposal to the target base station through the core network.

According to an aspect of the invention, the method comprises:
The downlink data forwarding proposed by the source base station is specific to a Protocol Data Unit (PDU) session, and/or a Qos flow in a PDU session, and/or a Data Radio Bearer (DRB) in a PDU session.

According to an aspect of the invention, the method comprises:
in a source-to-target transparent container or in a handover required message, the source base station contains PDU session information requiring data forwarding and/or Qos flow information requiring data forwarding.

According to an aspect of the invention, the method comprises:
DRB information requiring data forwarding is further contained in the source-to-target transparent container;

and the DRB information contains a DRB identifier and/or the downlink data forwarding proposed by the source base station.

According to an aspect of the invention, the method comprises:

the source base station can contain the DRB information requiring data forwarding only when the direct data forwarding path is available.

According to an aspect of the invention, the method comprises:

for the indirect data forwarding, the target base station allocates a user plane tunnel information for each PDU session requiring data forwarding, and the tunnel information contains an address of a transport layer and a Tunnel Endpoint ID (TEID).

According to an aspect of the invention, the method comprises:

the target base station can also allocate a user plane tunnel information for each Qos flow requiring data forwarding, and the tunnel information contains an address of a transport layer and a TEID.

According to an aspect of the invention, the method comprises:

for the direct data forwarding, the target base station allocates a user plane tunnel for each DRB requiring data forwarding, and the user plane tunnel information contains an address of a transport layer and a TEID.

According to an aspect of the invention, the method comprises:

the target base station includes the tunnel information allocated for data forwarding on a DRB in a target-to-source transparent container, or includes the information directly in a handover request acknowledgement message for being transmitted to a AMF.

According to an aspect of the invention, the method comprises:

the target base station allocates a user plane tunnel information for each PDU session requiring data forwarding, and the tunnel information contains an address of a transport layer and a TEID.

According to an aspect of the invention, the method comprises:

the target base station can also allocate a user plane tunnel information for each Qos flow requiring data forwarding, and the tunnel information contains an address of a transport layer and a TEID.

According to an aspect of the invention, the method comprises:

for the direct data forwarding, the AMF transmits the tunnel information allocated by the target base station to the source base station; and if handover is performed between different AMFs, a target AMF transmits the tunnel information allocated by the target base station to the source base station via a source AMF.

According to an aspect of the invention, the method comprises:

for the indirect data forwarding, the AMF transmits, to the source base station, the data forwarding tunnel information allocated by an UPF; and if the UPF changes during a handover process, the AMF transmits, to the source base station, the data forwarding tunnel information allocated by the source UPF.

By the method for supporting handover, a data forwarding problem during a handover process can be solved, so that the loss of data is avoided, the time of data interruption is decreased and the continuity of services is ensured.

Advantageous Effects of Invention

In the present disclosure, different data forwarding methods can be supported, the loss of data can be avoided and the continuity of services can be ensured. If an AMF transmits, according to the stored N2 SM information, the PDU session information of a UE to a target base station, the AMF does not need to interact with an SMF to obtain the PDU session information of the UE, so that the handover delay is reduced, in the handover preparation stage.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for an apparatus and method for supporting handover in a wireless communication system.

The terms referring to the apparatus and method for supporting handover, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
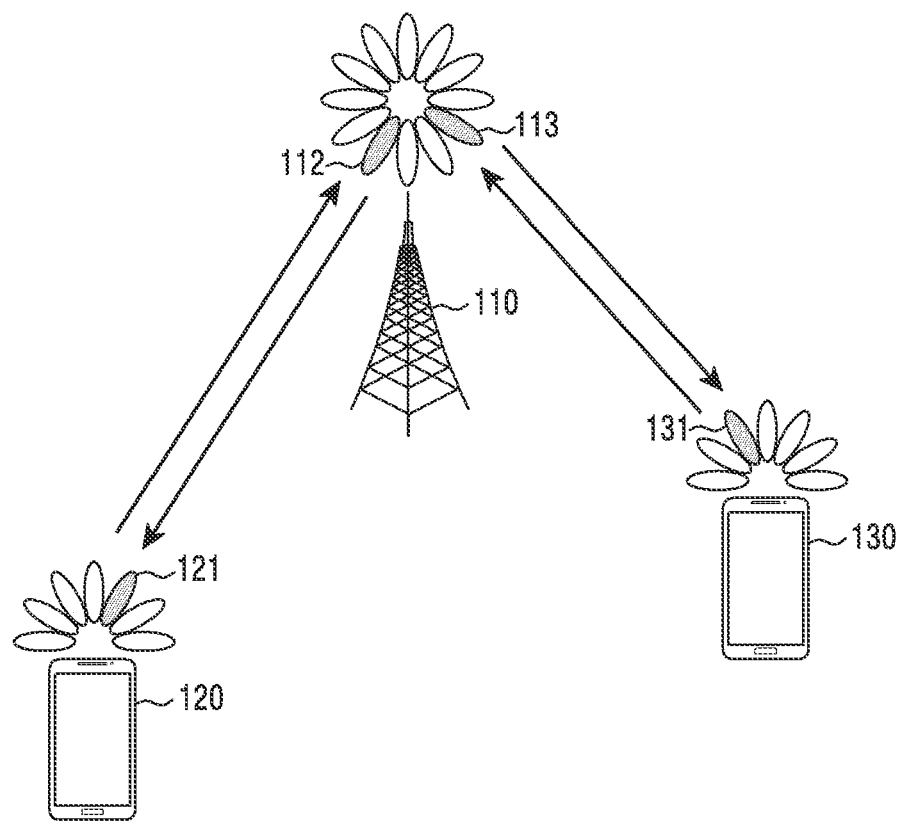
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHZ, and 60 GHZ). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
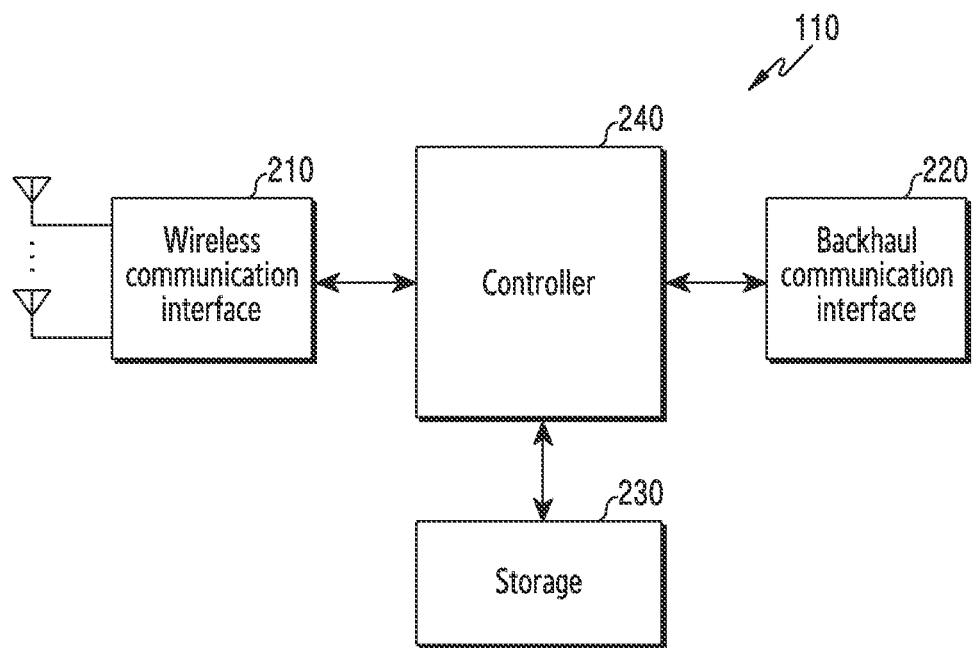
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

Figure 3:
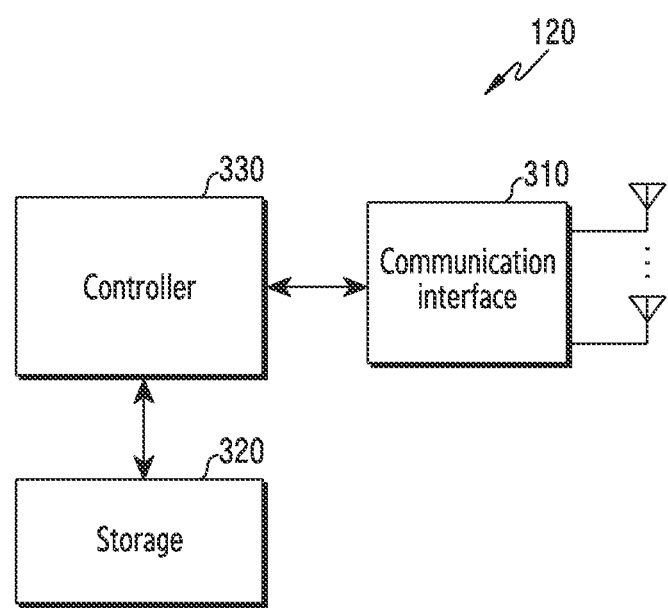
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

Figure 4:
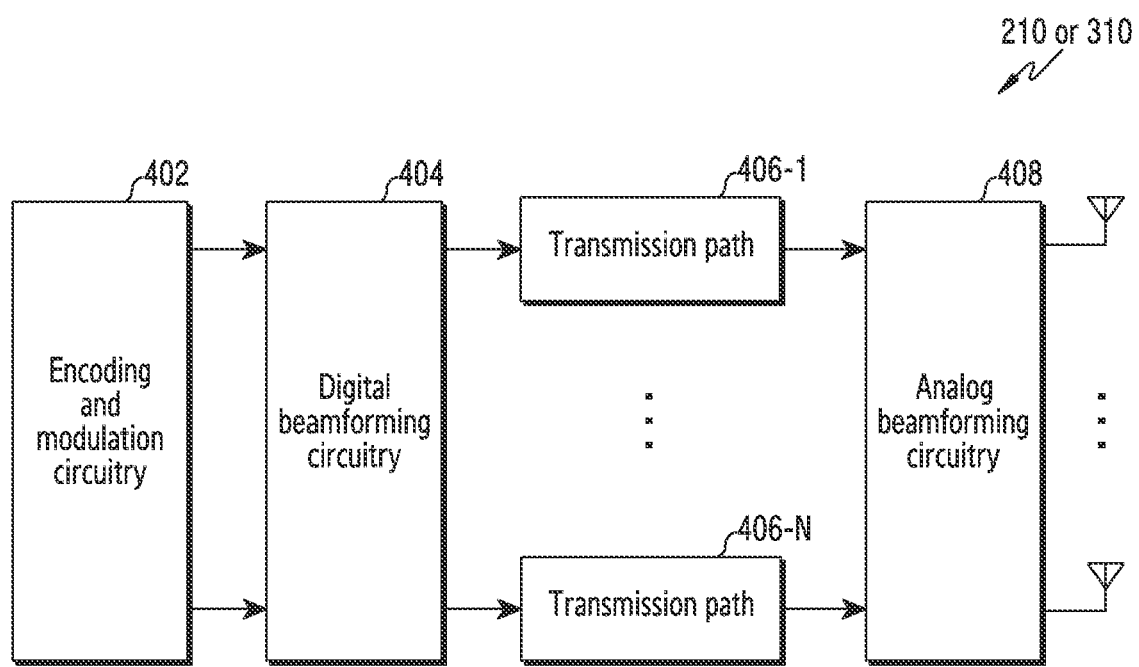
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Figure 5:
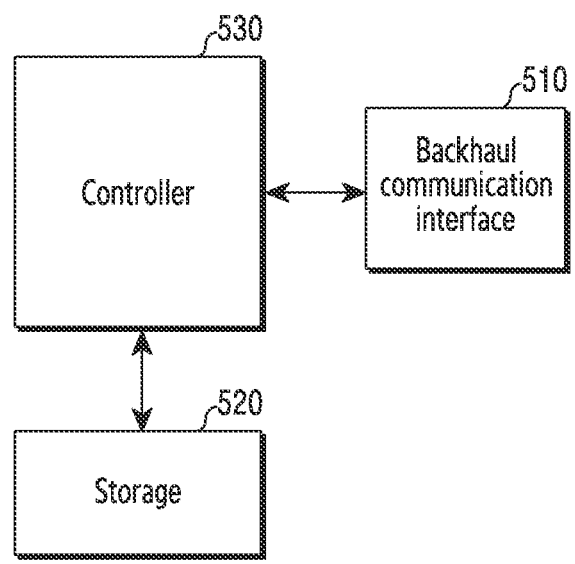
FIG. 5 illustrates a network entity in the wireless communication system according to various embodiments of the present disclosure.

FIG. 5 illustrates a network entity in the wireless communication system according to various embodiments of the present disclosure. For example, the network entity may be an Access Control and Mobility Management Function Entity (AMF), an User Plane Function Entity (UMF) or a server. The term "-module", "-unit" or "-er" used hereinafter may refer to the unit for processing at least one function or operation and may be implemented in hardware, software, or a combination of hardware and software.

Referring to FIG. 5, the network entity may include a backhaul communication interface 510, a storage unit 520, and a controller 530.

The backhaul communication interface 510 provides an interface for performing communication with other nodes within the network. That is, the backhaul communication interface 510 converts bitstreams transmitted to another node, for example, another access node, a BS, a higher node, or a core network, from the network entity into a physical signal and converts the physical signal received from the other node into the bitstreams.

The storage unit 520 stores a basic program, an application, and data such as setting information for the operation of the network entity. The storage unit 520 may include a volatile memory, a non-volatile memory, or a combination of volatile memory and non-volatile memory. Further, the storage unit 1320 provides stored data in response to a request from the controller 1330.

The controller 530 controls the general operation of the network entity. For example, the controller 530 transmits and receives a signal through the backhaul communication interface 1310. Further, the controller 530 records data in the storage unit 520 and reads the recorded data. The controller 530 may performs functions of a protocol stack that is required from a communication standard. To this end, the controller 1330 may include at least one processor.

According to exemplary embodiments of the present disclosure, the controller 530 may receive from source base station whether a direct data forwarding path is available, and determine data forwarding scheme based on the whether a direct data forwarding path is available, and transmit to target base station, the determined data forwarding scheme, and receive from target base station allocated data forwarding tunnel information by target base station based on the data forwarding scheme, and transmit to source base station, the allocated data forwarding tunnel information.

For example, the controller 530 may control the network entity to perform operations according to the exemplary embodiments of the present disclosure.

Figure 6:
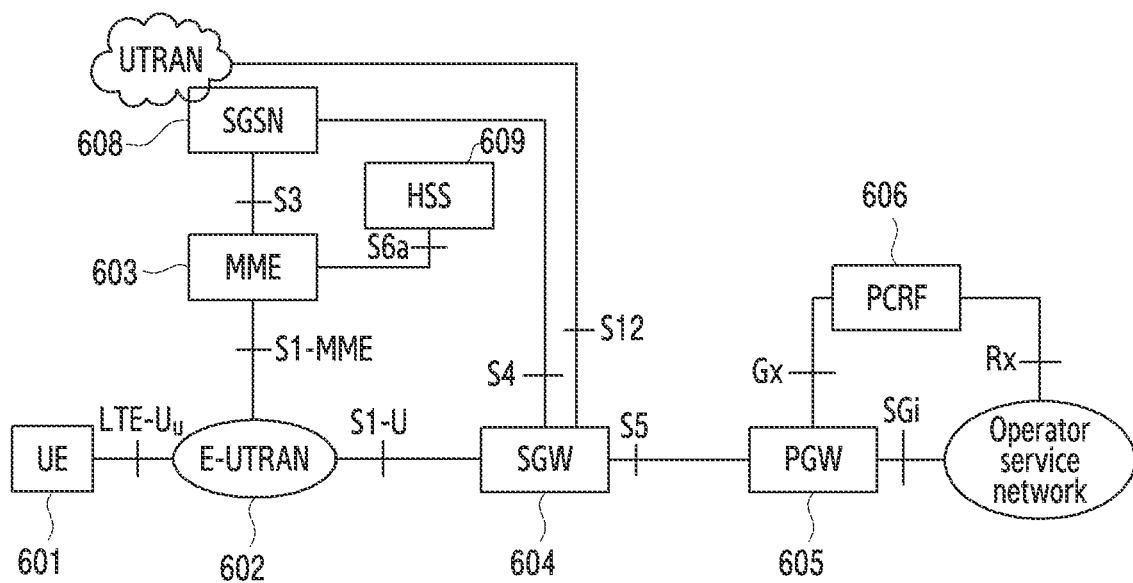
FIG. 6 is a system architecture diagram showing System Architecture Evolution (SAE)

As shown in FIG. 6, which is a system architecture diagram showing System Architecture Evolution (SAE). Wherein:

A User Equipment (UE) 601 is a terminal equipment for receiving data. An Evolved Universal Terrestrial Radio Access Network (E-UTRAN) 602 is a radio access network in which a macro eNodeB/NodeB providing the UE with an interface for accessing the radio network is included. A Mobile Management Entity (MME) 603 is responsible for managing a movement context, a session context and security information for the UE. A Service Gateway (SGW) 604 mainly functions to provide a user plane, and the MME 603 and the SGW 604 may be in a same physical entity. A Packet Data Network Gateway (PGW) 605 is responsible for charging, lawful interception or more, and the PGW 605 and the SGW 604 may also be in a same physical entity. A Policy and Charging Rules Function Entity (PCRF) 606 provides Quality of Service (QOS) policy and charging rules. A Serving GPRS Support Node (SGSN) 608 is a network node equipment providing routing for data transport in a Universal Mobile Telecommunication System (UMTS). A Home Subscriber Server (HSS) 609 is a home subsystem of the UE, and is responsible for protecting user information such as the current location of the UE, the address of a serving node, user security information, a packet data context of the UE.

Figure 7:
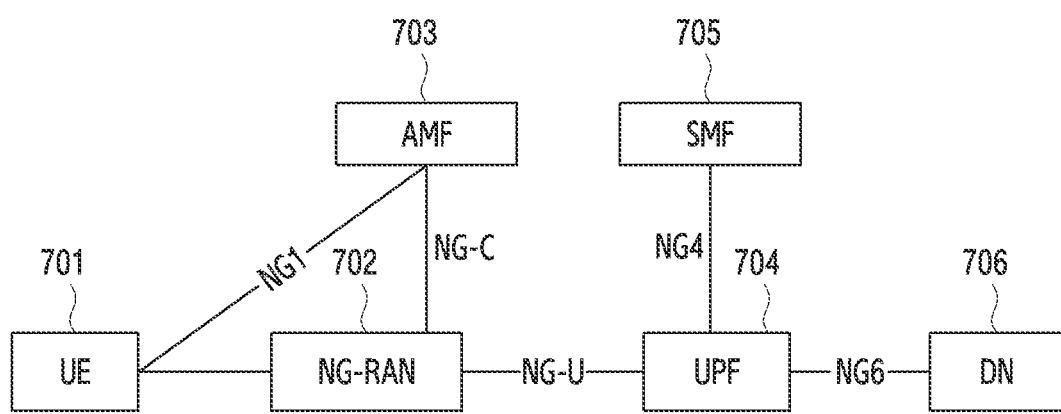
FIG. 7 is a schematic diagram of an initial overall architecture of 5G.

As shown in FIG. 7, which is a system architecture diagram showing a next generation network or a 5G network. Wherein:

A User Equipment (UE) 701 is a terminal equipment for receiving data. A Next Generation Radio Access Network (NG-RAN) 702 is a radio access network in which a base station (a gNB or an eNB connected to a 5G Core Network (5GC)) providing the UE with an interface for accessing the radio network is included. An Access Control and Mobility Management Function Entity (AMF) 703 is responsible for managing a mobility context and security information for the UE. A User Plane Function Entity (UPF) 704 provide a user plane function. A Session Management Function Entity (SMF) 705 is responsible for session management. A Data Network (DN) 706 contains services from operators, the access to Internet, third-party services or more.

When the UE moves between two base stations in the NG-RAN, in order to ensure the continuity of services, it is necessary to define a handover procedure, including a handover between gNBs and a handover between a gNB and an eNB connected to the 5GC.

Figure 8:
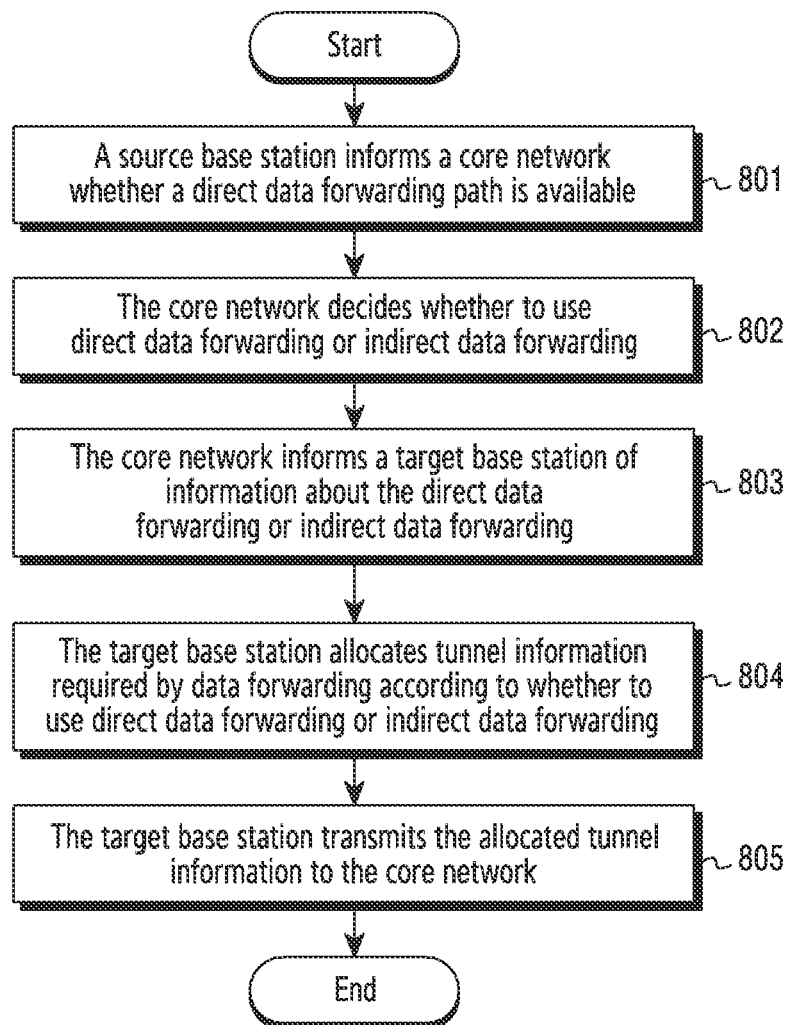
FIG. 8 is a schematic diagram of a first method for supporting handover according to the present invention.

FIG. 8 shows a first method for supporting handover according to the present invention. In this method, a source base station and a target base station can be gNBs or eNBs connected to a 5GC, and a base station connected to a 5GC may be an ng-eNB. A core network entity can be an AMF. This method comprises the following steps:

Step 801: A source base station informs a core network whether a direct data forwarding path is available. The source base station can decide, based on the presence or absence of an Xn interface between the source base station and a target base station, whether the direct data forwarding path is available. Without influencing the main contents of the present invention, the source base station can also decide whether to perform direct data forwarding by considering other factors, for example, by considering the presence or absence of an IP connection between the source base station and the target base station. The source base station informs, by a handover required message, the core network whether the direct data forwarding path is available.

The source base station proposes downlink data forwarding. The downlink data forwarding proposed by the source base station is specific to a PDU session, and/or a Qos flow in a PDU session, and/or a DRB in a PDU session. In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-totarget transparent container. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

Step 802: The core network decides whether to use direct data forwarding or indirect data forwarding. The core network decides, according to the information indicating whether the direct data forwarding path is available received from the source base station, whether to use direct data forwarding or indirect data forwarding. The core network can also decide, by considering other factors, whether to use direct data forwarding or indirect data forwarding, without influencing the main contents of the present invention.

Here, it is possible that an AMF or an SMF decides whether to use direct data forwarding or indirect data forwarding. For a handover between different AMFs, if a source AMF or SMF decides to use direct data forwarding, the source AMF informs a target AMF of information about the direct data forwarding.

Step 803: The core network informs a target base station of information about the direct data forwarding or indirect data forwarding. Here, the core network entity is an AMF or a target AMF for handover between different AMFs. The AMF informs, by a handover request message, the target base station of direct data forwarding or indirect data forwarding. The AMF can inform the target base station of information about the direct data forwarding when the direct data forwarding is used. When there is no information about the direct data forwarding in the handover request message, the target base station knows that the direct data forwarding is impossible. The handover request further contains information about a PDU session to be established. The information about a PDU session to be established contains a PDU session identifier. The handover request message contains a source-to-target transparent container. The information contained in the source-to-target transparent container is the same as that in the step 801 and will not be repeated in detail herein.

Step 804: The target base station allocates data forwarding tunnel information. If the target base station accepts the downlink data forwarding proposed by the source base station, the target base station allocates data forwarding tunnel information.

The target base station knows, according to the handover request message received from the AMF, whether to use direct data forwarding or indirect data forwarding.

For the indirect data forwarding, the target base station allocates user plane tunnel information for each PDU session requiring data forwarding, and the tunnel information contains an address of a transport layer and a TEID. If the source base station proposes data forwarding for Qos flow(s) in the PDU session, the target base station can also allocate user plane tunnel information for each Qos flow requiring data forwarding, and the tunnel information contains an address of a transport layer and a TEID. The source base station can know that the target base station has accepted the data forwarding for a Qos flow, through user plane tunnel information corresponding to the Qos flow. If the source base station proposes data forwarding for a Qos flow in the PDU session and the target base station accepts the data forwarding for the Qos flow, the target base station allocates data forwarding tunnel information for the correspondingly PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, the target base station may also allocate user plane tunnel information to each DRB that requires data forwarding. The tunnel information includes a transport layer address and TEID. The source base station can know that the target base station has accepted the data forwarding for the DRB, through the user plane tunnel information corresponding to the DRB. If the source base station proposes the data forwarding for a DRB in a PDU session, and the target base station accepts the data forwarding for the DRB, the target base station allocates data forwarding tunnel information to the corresponding PDU session of the DRB. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

For the direct data forwarding, the target base station has two ways to allocate tunnel for data forwarding.

Way 1: The target base station allocates a user plane tunnel for each DRB requiring data forwarding, and the user plane tunnel information contains an address of a transport layer and a TEID. The target base station includes the tunnel information allocated for data forwarding on a DRB in a target-to-source transparent container, or includes the information directly in a handover request acknowledgement message for being transmitted to an AMF. In case of direct data forwarding, the target base station can allocate tunnel information per DRB for data forwarding. Or, according to the information about a DRB of proposed data forwarding contained in the source-to-target transparent container which is received from the source base station, the target base station knows a DRB requiring data forwarding and then allocates tunnel information for this DRB. The target base station further allocates user plane tunnel information for each PDU session requiring data forwarding, and the tunnel information contains an address of a transport layer and a TEID. If the source base station proposes data forwarding for Qos flow(s) in the PDU session, the target base station can also allocate user plane tunnel information for each Qos flow requiring data forwarding, and the tunnel information contains an address of a transport layer and a TEID. The source base station can know that the target base station has accepted the data forwarding for a Qos flow, through user plane tunnel information corresponding to the Qos flow. If the source base station proposes data forwarding for a Qos flow in a PDU session, and the target base station accepts the data forwarding for the Qos flow, the target base station allocates data forwarding tunnel information to the corresponding PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

Way 2: The target base station allocates a user plane tunnel for each DRB requiring data forwarding, and the user plane tunnel information contains an address of a transport layer and a TEID. The target base station includes the tunnel information allocated for data forwarding for a DRB in a target-to-source transparent container, or includes the information directly in a handover request acknowledgement message for being transmitted to an AMF. In case of direct data forwarding, the target base station can also allocate tunnel information per DRB for data forwarding. Or, according to the information about a DRB of proposed data forwarding contained in the source-to-target transparent container which is received from the source base station, the target base station knows a DRB requiring data forwarding and then allocates tunnel information for this DRB.

According to the proposal for data forwarding per PDU session, and/or per Qos flow and/or per DRB given by the source base station, the target base station can allocate the corresponding data forwarding tunnel information for the PDU session, the Qos flow and/or the DRB. Or, based on the proposal given by the source base station and in combination with whether to use the direct data forwarding or indirect data forwarding, the target base station decides to allocate data forwarding tunnel information for the PDU session, the Qos flow and/or the DRB. Or, according to whether to use the direct data forwarding or the indirect data forwarding, the target base station decides to allocate data forwarding tunnel information for the PDU session, the Qos flow and/or the DRB. In case of the indirect data forwarding, the target base station allocates tunnel information for the PDU session and/or the Qos flow. In case of the direct data forwarding, the target base station allocates tunnel information used for the PDU session, the Qos flow and/or the DRB. If the source base station proposes data forwarding for a Qos flow in a PDU session and the target base station accepts the data forwarding for the Qos flow, the target base station allocates data forwarding tunnel information for the correspondingly PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station. If the source base station proposes the data forwarding for a DRB in a PDU session, the target base station may also allocate user plane tunnel information to each DRB that requires data forwarding. The tunnel information includes a transport layer address and TEID. The source base station can know that the target base station has accepted the data forwarding for the DRB, through the user plane tunnel information corresponding to the DRB. If the source base station proposes the data forwarding for a DRB in a PDU session, and the target base station accepts the data forwarding for the DRB, the target base station allocates data forwarding tunnel information to the corresponding PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station can also decide whether to allocate tunnel information used for DRB-level data forwarding, by considering whether the same DRB configuration and the same mapping from the Qos flow to the DRB as the source base station are used or a full configuration is used. If the target base station uses the same DRB configuration and the same mapping from the Qos flow to the DRB as the source base station, the target base station allocates tunnel information for the DRB-level data forwarding. If the target base station uses the full configuration, the target base station does not allocate tunnel information for the DRB-level data forwarding and instead allocates tunnel information used for PDU session-level and/or Qos flow-level data forwarding. This method is suitable for Xn handover and NG handover.

On the basis of considering whether the DRB configuration and the mapping from the Qos flow to the DRB are the same as the source base station or whether the full configuration is used, the target base station can also take whether to use the direct data forwarding or indirect data forwarding into consideration so as to decide whether to allocate tunnel information used for the DRB-level data forwarding. If the target base station uses the same DRB configuration and the same mapping from the Qos flow to the DRB as the source base station and the direct data forwarding is used, the target base station allocates tunnel information for the DRB-level data forwarding. If the target base station uses the full configuration or the indirect data forwarding, the target base station does not allocate tunnel information for the DRB-level data forwarding and instead allocates tunnel information used for PDU session-level and/or Qos flow-level data forwarding.

The foregoing description is mainly specific to the downlink data forwarding.

The target base station proposes uplink data forwarding. The uplink data forwarding proposed by the target base station is specific to a PDU session, a Qos flow and/or a DRB. When the target base station uses the same DRB configuration and the same mapping from the Qos flow to the DRB as the source base station and the direct data forwarding is used, the target base station can propose data forwarding per DRB. In this case, the data forwarding for the PDU session can also be performed simultaneously. When the target base station does not use the same DRB configuration as the source base station or uses a mapping from the Qos flow to the DRB different from the source base station or uses the indirect data forwarding, the target base station proposes data forwarding for the PDU session or the Qos flow. The target base station allocates, according to the proposed uplink data forwarding, corresponding data forwarding tunnel(s). When the target base station proposes uplink data forwarding for a Qos flow or DRB, the target base station may allocate uplink data forwarding tunnel information for the PDU session to which the Qos flow or DRB belongs. The message transmitted by the target base station to the source base station contains a Qos flow identifier and/or DRB identifier proposed for data forwarding.

For the uplink data forwarding, the target base station can propose data forwarding for the PDU session, and the target base station allocates uplink data forwarding tunnel information for the PDU session proposed for the data forwarding.

Step 805: The target base station transmits the allocated data forwarding tunnel information to the core network. For different data forwarding methods in the step 804, the data forwarding tunnel information can be specific to each PDU session, each Qos flow and/or each DRB. The data forwarding tunnel information can be contained in a target-to-source transparent container and/or a handover request acknowledgement message. Preferably, the data forwarding tunnel information corresponding to the DRB can be contained in the target-to-source transparent container. The data forwarding tunnel information contains downlink data forwarding tunnel information and/or uplink data forwarding tunnel information. For the direct data forwarding, the AMF transmits the tunnel information allocated by the target base station to the source base station. If the target base station contains direct data forwarding tunnel information in the target-to-source transparent container, the information is invisible to the AMF and directly transmitted to the source base station by the AMF. If handover is performed between different AMFs, a target AMF transmits the tunnel information allocated by the target base station to the source base station via a source AMF.

If the source base station proposes data forwarding for a Qos flow in a PDU session and the target base station accepts the data forwarding for the Qos flow, the target base station allocates data forwarding tunnel information for the correspondingly PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station. If the source base station proposes the data forwarding for a DRB in a PDU session, the target base station may also allocate user plane tunnel information to each DRB that requires data forwarding. The tunnel information includes a transport layer address and TEID. The source base station can know that the target base station has accepted the data forwarding for the DRB, through the user plane tunnel information corresponding to the DRB. If the source base station proposes the data forwarding for a DRB in a PDU session, and the target base station accepts the data forwarding for the DRB, the target base station allocates data forwarding tunnel information to the corresponding PDU session of the DRB. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

For the indirect data forwarding, the AMF requests, through an SMF, an UPF to allocate indirect data forwarding tunnel information. The indirect data forwarding tunnel information is used for data forwarding from the source base station to the UPF. Meanwhile, the AMF transmits, through the SMF and to the UPF, the data forwarding tunnel information allocated by the target base station, for data forwarding from the UPF to the target base station. The UPF transmits the allocated data forwarding tunnel information to the AMF through the SMF. The tunnel information is specific to each PDU session or each Qos flow in each PDU session. The tunnel information can also be specific to each DRB. The tunnel information contains an address of a transport layer and a tunnel identifier TEID.

For the handover between different AMFs, a target AMF requests, by an SMF, a target UPF to allocate indirect data forwarding tunnel information. The target UPF transmits the allocated data forwarding tunnel information to the target AMF through the SMF. The tunnel information is used for data forwarding from a source UPF to the target UPF. The target AMF transmits, to a source AMF, the data forwarding tunnel information allocated by the target UPF. The source AMF requests, by the SMF, the source UPF to allocate indirect data forwarding tunnel information. The tunnel information is used for data forwarding from the source base station to the source UPF. The source AMF transmits, by the SMF and to the source UPF, the data forwarding tunnel information allocated by the target UPF, for data forwarding from the source UPF to the target UPF.

For the indirect data forwarding, the AMF transmits, to the source base station, the data forwarding tunnel information allocated by an UPF. If the UPF changes during a handover process, the AMF transmits, to the source base station, the data forwarding tunnel information allocated by the source UPF.

In downlink, the source base station performs data forwarding according to the received data forwarding tunnel information. The source base station can further perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is per each Qos flow, per each DRB or per each PDU session. The data forwarding can be direct data forwarding or indirect data forwarding. For the direct data forwarding, data not acknowledged by a UE and/or data allocated with a PDCP SN can be forwarded through a tunnel for each DRB. Fresh data can be forwarded through a tunnel corresponding to each PDU session or a tunnel corresponding to each Qos flow. The forwarded data can be a GTP-U data packet, an SDAP data packet or a PDCP data packet. The PDCP data packet can be a data packet containing a PDCP SN or a data packet containing no PDCP SN. For the indirect data forwarding, the data forwarded by the tunnel corresponding to each PDU session can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. If the full configuration is used, the source base station forwards only fresh downlink data to the target base station. If the target base station uses the same DRB configuration and the same mapping from the Qos flow to the DRB as the source base station, the source base station forwards, to the target base station, downlink data not acknowledged by a UE, data not transmitted to the UE, data allocated with a PDCP SN and/or fresh data. This method is suitable for Xn handover and NG handover. For the NG handover, the target base station can transmits, by a target-to-source transparent container to the source base station, information indicating whether the same DRB configuration and the same mapping from the Qos flow to the DRB as the source base station are used or the full configuration is used. Or, the target base station transmits the information to the source base station through an NGAP message, a handover request acknowledgement message and a handover command message.

In uplink, if the source base station accepts the data forwarding proposed by the target base station, the source base station performs data forwarding according to the received data forwarding tunnel information. The source base station can perform data forwarding on the data of the Qos flow or DRB in a corresponding data forwarding tunnel, if the source base station accepts the uplink data forwarding, according to a Qos flow, DRB or PDU session proposed for data forwarding by the target base station. The data forwarding tunnel information can correspond to a Qos flow, DRB or PDU session. The data forwarding can be direct data forwarding or indirect data forwarding.

So far, the first method for supporting handover according to the present invention has been described. By this method, the target base station can know whether direct data forwarding or indirect data forwarding is used for the handover, so that different data forwarding tunnels are allocated to support different data forwarding methods. Consequently, the loss of data is avoided, and the continuity of services is ensured.

Figure 9:
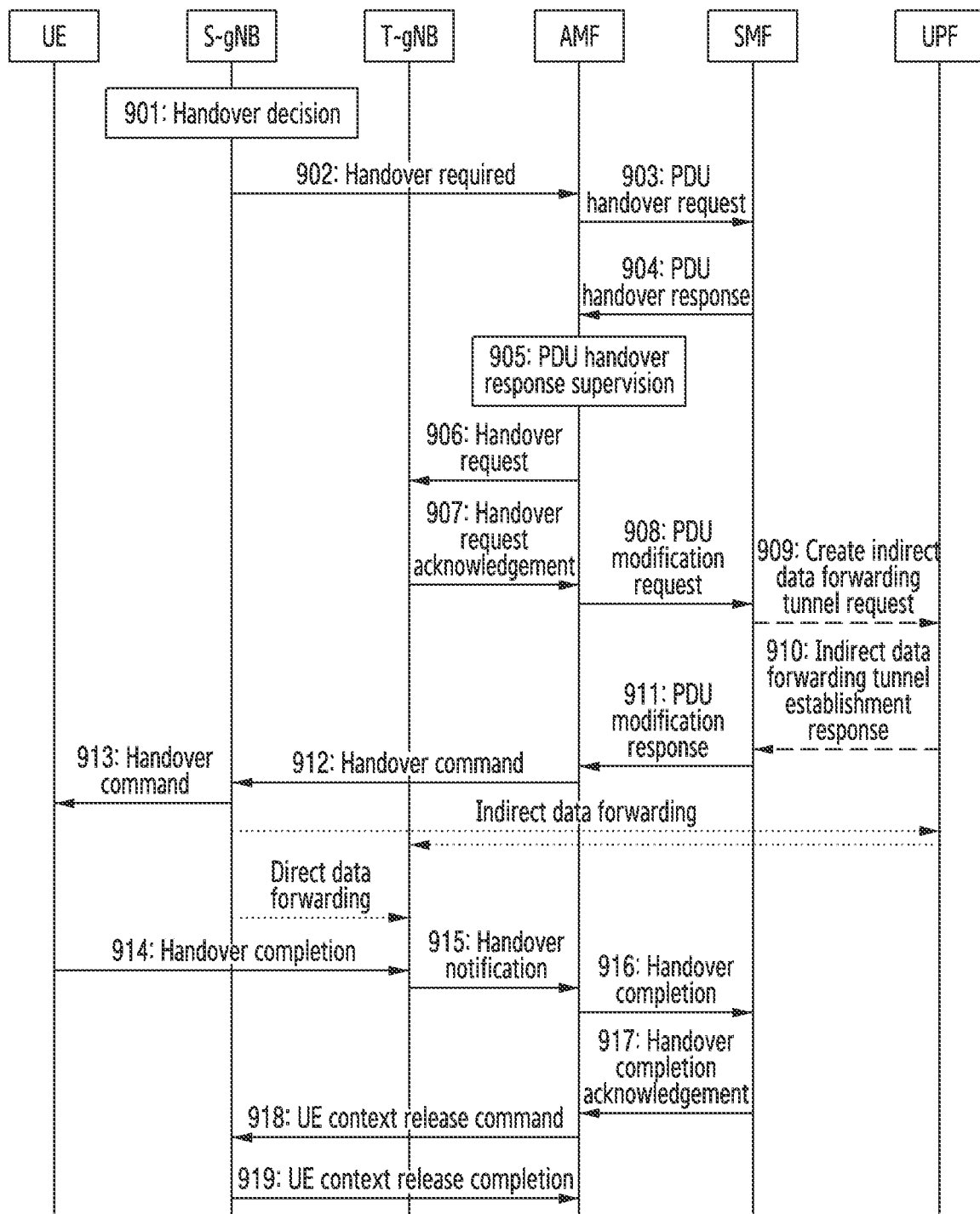
FIG. 9 is a schematic diagram of Embodiment 1 of the first method for supporting handover according to the present invention.

FIG. 9 shows Embodiment 1 of the first method of the present invention. This embodiment will be described by taking both the source base station and the target base station being gNBs as example. Actually, this embodiment is also applicable to a situation where the source base station is an eNB connected to the 5GC or the target base station is an eNB connected to the 5GC, and a base station connected to a 5GC may also be an ng-eNB. Here, the detailed description of steps irrelevant to the present invention has been omitted. This embodiment comprises the following steps.

Step 901: A source gNB (S-gNB) decides to initiate a handover to a UE.

Step 902: The S-gNB transmits a handover required message to an AMF.

The source base station proposes downlink data forwarding. The downlink data forwarding proposed by the source base station is specific to a PDU session, and/or a Qos flow in a PDU session, and/or a DRB in a PDU session.

The message contains information about whether the direct data forwarding path is available. When the direct data forwarding path is available, the S-gNB can contain information indicating that the direct data forwarding path is available. Through the absence of the direct data forwarding path information element, the AMF knows that the direct data forwarding path is not available. The source base station can decide, based on the presence or absence of an Xn interface between the source base station and a target base station, whether the direct data forwarding path is available. Without influencing the main contents of the present invention, the source base station can also decide whether to perform direct data forwarding by considering other factors, for example, by considering the presence or absence of an IP connection between the source base station and the target base station.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-to-target transparent container or in a handover required message. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

As another method of this embodiment, a list of PDU session information of the UE can be contained in the handover required message. The PDU session information of the UE contains a PDU session identifier, PDU session Qos information, and/or a list of Qos flow information contained in the PDU session. The list of Qos flow information contains a Qos flow identifier and/or Qos information of the Qos flow. The PDU session information can further contain information about an NG interface SM. In this method, the steps 903, 904 and 905 may not be executed.

Step 903: The AMF transmits a PDU handover request message to an SMF. This message is specific to each PDU session on which an NG handover is request to be performed. This message contains a PDU session identifier and a target identifier.

Step 904: The SMF transmits a PDU handover response message to the AMF. This message contains a PDU session identifier and information of Session Management (SM) at an NG-C interface. The SMF selects an UPF having an interface with a target gNB.

Step 905: The AMF detects the PDU handover response message from each SMF. When the AMF receives all PDU handover responses or the maximum waiting time arrives, the handover process is continuously executed. The AMF decides whether to use direct data forwarding or indirect data forwarding. The AMF decides, according to the information indicating whether the direct data forwarding path is available received from the S-gNB, whether to use direct data forwarding or indirect data forwarding. The AMF can also decide, by considering other factors, whether to use direct data forwarding or indirect data forwarding, without influencing the main contents of the present invention. The AMF decides whether the data forwarding is possible. The infeasibility of the data forwarding can be specific to each PDU session.

For a handover between different AMFs, if a source AMF or a source SMF decides to use direct data forwarding, the source AMF informs a target AMF of information about the direct data forwarding. The source AMF informs the target AMF of information indicating whether the data forwarding is possible.

Step 906: The AMF transmits a handover request message to a target gNB (T-gNB). This message contains a source-to-target transparent container. This message contains the information of the SM, at the NG-C interface, received from the SMF in the step 904. This message contains the direct data forwarding or indirect data forwarding. The AMF can inform the target base station of the direct data forwarding when the direct data forwarding is used. When there is no direct data forwarding in the handover request message, the target base station knows that the direct data forwarding is impossible. The handover request further contains information about a PDU session to be established. The information about a PDU session to be established contains a PDU session identifier. This message contains information indicating that the data forwarding is impossible. The infeasibility of the data forwarding can be specific to each PDU session. If this message contains the direct data forwarding or indirect data forwarding or absence of information element indicating that the data forwarding is impossible, it is indicated that the data forwarding is possible. For a certain PDU session, if there is no any information element indicating that the data forwarding is impossible, it is indicated that the data forwarding for the PDU session is possible. The handover request message contains a source-to-target transparent container. The information contained in the source-to-target transparent container is the same as that in the step 801 and will not be repeated in detail herein.

A specific method for allocating data forwarding tunnels by the T-gNB is the same as that in the step 804 and will not be repeated in detail herein. A specific method for proposing, by the T-gNB, uplink data forwarding and allocating uplink data forwarding tunnel(s) is the same as that in the step 804 and will not be repeated here.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message in the step 907 and the handover command message in the step 912.

Step 907: The T-gNB transmits a handover request acknowledgement message to the AMF. This message contains the data forwarding tunnel information allocated by the target base station. This message contains a target-to-source transparent container. This message contains a list of established PDU sessions and/or a list of unsuccessfully established PDU sessions. For an established PDU session, this message contains successfully established Qos flows and unsuccessfully established Qos flows. For different data forwarding methods in the step 804, the data forwarding tunnel information can be specific to each PDU session and/or each Qos flow and/or each DRB. The data forwarding tunnel information can be contained in a target-to-source transparent container and/or a handover request acknowledgement message. Preferably, the data forwarding tunnel information corresponding to the DRB can be contained in the target-to-source transparent container.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein.

Step 908: The AMF transmits a PDU modification request message to the SMF. This message contains the indirect data forwarding tunnel information allocated by the T-gNB. The AMF can transmit, by modifying the PDU request message and to the SMF, the indirect data forwarding tunnel information allocated by the T-gNB and then request to allocate tunnel information used for data forwarding from the S-gNB to the UPF; or the AMF can transmit, by another single message, the indirect data forwarding tunnel information allocated by the T-gB and then request to allocate tunnel information used for data forwarding from the S-gNB to the UPF.

For the handover between different AMFs, a target AMF requests, by an SMF, a target UPF to allocate indirect data forwarding tunnel information. The target UPF transmits the allocated data forwarding tunnel information to the target AMF through the SMF. The tunnel information is used for data forwarding from a source UPF to the target UPF. The target AMF transmits, to a source AMF, the data forwarding tunnel information allocated by the target UPF. The source AMF requests, by the SMF, the source UPF to allocate indirect data forwarding tunnel information, and the tunnel information is used for data forwarding from the source base station to the source UPF. The source AMF transmits, by the SMF and to the source UPF, the data forwarding tunnel information allocated by the target UPF, for data forwarding from the source UPF to the target UPF.

Step 909: The SMF transmits a create indirect data forwarding tunnel request message to the UPF, sends the indirect data forwarding tunnel information allocated by the T-gNB to the UPF, and requests the UPF to allocate tunnel information used for data forwarding from the S-gNB to the UPF. The message can also be a session modification message between the SMF and the UPF. The SMF can request the UPF to establish indirect data forwarding tunnel only when receiving the indirect data forwarding tunnel information allocated by the T-gNB.

Step 910: The UPF transmits an indirect data forwarding tunnel establishment response message to the SMF. This message can also be a session modification response message between the SMF and the UPF. This message contains the data forwarding tunnel information from the S-gNB to the UPF allocated by the UPF. The tunnel information can be specific to each PDU session and/or each Qos flow in each PDU session. The tunnel information can also be specific to a DRB.

Step 911: The SMF transmits a PDU modification response message to the AMF. This message contains the data forwarding tunnel information from the S-gNB to the UPF allocated by the UPF. The SMF can transmit, by another single message and to the AMF, the indirect data forwarding tunnel information allocated by the UPF.

Step 912: The AMF transmits a handover command message to the S-gNB. This message contains a target-to-source transparent container. For the indirect data forwarding, the AMF transmits, to the source base station, the data forwarding tunnel information allocated by the UPF. If the UPF changes during a handover process, the AMF transmits, to the source base station, the data forwarding tunnel information allocated by the source UPF. For a successfully established Qos flow, the message may also contain an indication that the target base station has accepted data forwarding for the Qos flow. For a successfully established DRB, the message may also contain an indication that the target base station has accepted data forwarding for the DRB. The message also contains Qos flow information proposed for uplink data forwarding by the target base station or DRB information proposed for uplink data forwarding by the target base station or PDU session information proposed for uplink data forwarding by the target base station. The information may be tunnel identifier information allocated for data forwarding or uplink data forwarding proposal information corresponding to a Qos flow or DRB.

Step 913: The S-gNB transmits a handover command message to a UE.

In downlink, the source base station performs data forwarding according to the received data forwarding tunnel information. The source base station can perform data forwarding according to the received indication information of data forwarding accepted for a Qos flow and/or indication information of accepting data forwarding for a DRB, and perform data forwarding on the data of the Qos flow or DRB on a corresponding data forwarding tunnel. The data forwarding tunnel is corresponding to each Qos flow, each DRB or each PDU session. The data forwarding can be direct data forwarding or indirect data forwarding. For the direct data forwarding, data not acknowledged by a UE and/or data allocated with a PDCP SN can be forwarded through a tunnel for each DRB. Fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the indirect data forwarding, the data forwarded by the tunnel corresponding to each PDU session can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session. The data forwarding can be direct data forwarding or indirect data forwarding.

Step 914: The UE transmits a handover completion message to the T-gNB.

Step 915: The T-gNB transmits a handover notification message to the AMF.

Step 916: The AMF transmits a handover completion message to the SMF. This message contains the PDU session identifier. This message is specific to each PDU session.

Step 917: The SMF transmits a handover completion acknowledgement message to the AMF. The SMF needs to inform the selected UPF the information indicating that the downlink user plane tunnel is handed over to the T-gNB, that is, the downlink tunnel information allocated by the T-gNB.

Step 918: The AMF transmits a UE context release command message to the S-gNB.

Step 919: The S-gNB transmits a UE context release completion message to the AMF.

So far, Embodiment 1 of the first method of the present invention has been described. By the method in this embodiment, different data forwarding methods can be supported, the loss of data can be avoided and the continuity of services can be ensured.

Figure 10:
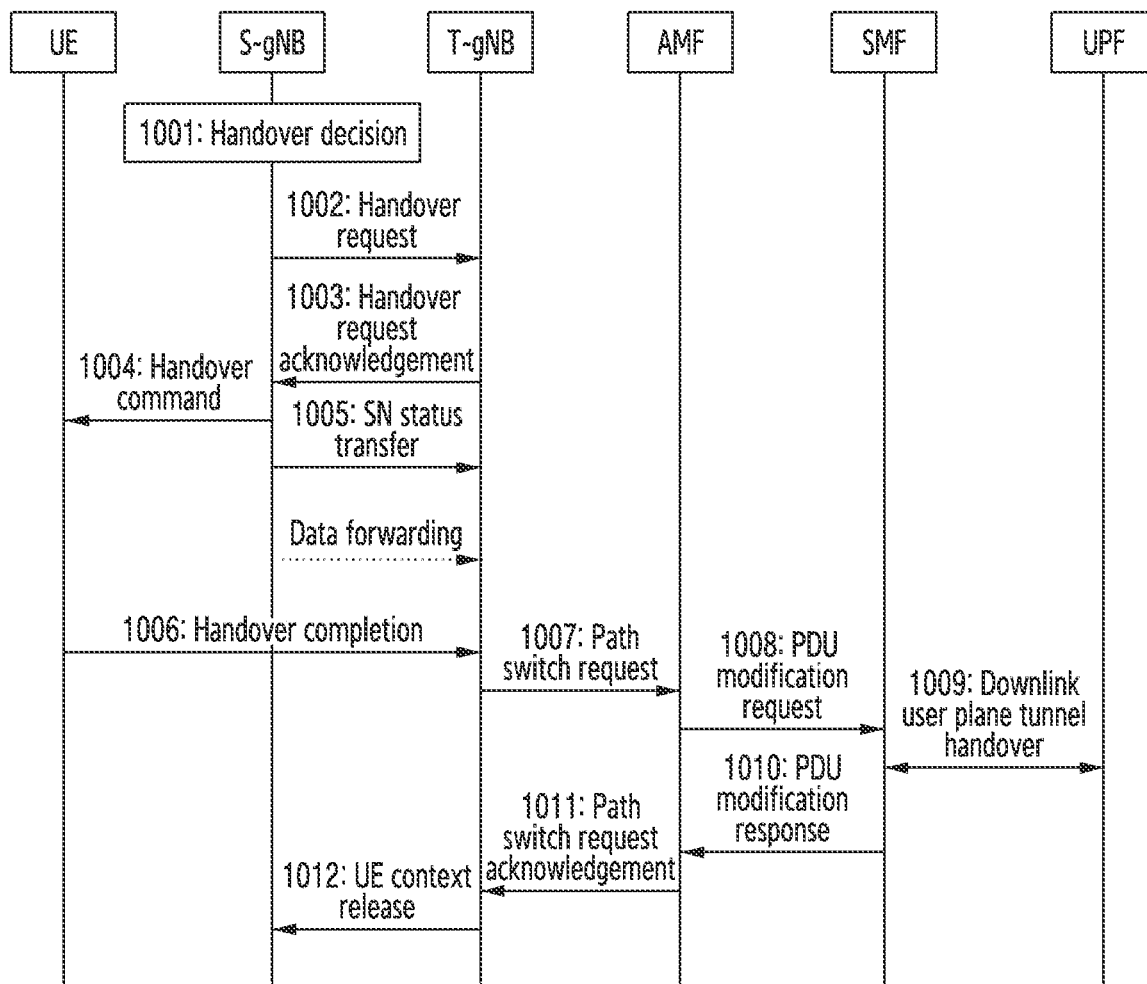
FIG. 10 is a schematic diagram of a second method for supporting handover according to the present invention.

FIG. 10 shows a second method for supporting handover according to the present invention. This method will be described by taking both a source base station and a target base station being gNBs as example. Actually, this method is also suitable for a situation where the source base station is an eNB connected to the 5GC or the target base station is an eNB connected to the 5GC, and a base station connected to a 5GC may also be an ng-eNB. Here, the detailed description of steps irrelevant to the present invention has been omitted. This embodiment comprises the following steps.

Step 1001: A source gNB (S-gNB) decides to initiate a handover to a UE.

Step 1002: The S-gNB transmits a handover request message to a target gNB (T-gNB).

The source base station proposes downlink data forwarding.

The downlink data forwarding proposed by the source base station is specific to a PDU session, and/or a Qos flow in a PDU session, and/or a DRB in a PDU session.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container or in the handover request message. DRB information requiring data forwarding can further be contained in the source-to-target transparent container or in a handover request message. The DRB information contains a DRB identifier and/or the downlink data forwarding proposed by the source base station.

Step 1003: The T-gNB transmits a handover request acknowledgement message to the S-gNB.

The target base station decides whether to use the same DRB configuration and the same mapping from the Qos flow to the DRB as the source base station, or use a full configuration.

If the base station decides to use the same DRB configuration and the same mapping from the Qos flow to the DRB as the source base station, the target base station allocates downlink data forwarding tunnel information used for each DRB requiring data forwarding. The target base station can also allocate downlink data forwarding tunnel information used for the PDU session requiring data forwarding, simultaneously.

If the target base station uses the full configuration, the target base station allocates downlink data forwarding tunnel information for the PDU session requiring data forwarding.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message.

The T-gNB informs the S-gNB of the allocated downlink data forwarding tunnel information.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The target base station proposes UL data forwarding for per PDU session, and/or per Qos flow and/or per DRB. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein. When the target base station uses the same DRB configuration and the same mapping from the Qos flow to the DRB as the source base station, the target base station can propose data forwarding per DRB. In this case, the data forwarding per PDU session can be performed simultaneously. When the target base station does not use the same DRB configuration as the source base station or uses a mapping from the Qos flow to the DRB different from the source base station, the target base station proposes data forwarding for the PDU session. The target base station allocates, according to the proposed uplink data forwarding, corresponding data forwarding tunnel(s).

For the uplink data forwarding, the target base station can propose data forwarding per PDU session, and the target base station allocates uplink data forwarding tunnel information for the PDU session requiring the data forwarding.

The T-gNB informs the S-gNB of the allocated uplink data forwarding tunnel information.

The handover request acknowledgement message further contains a target-to-source transparent container. This message contains a list of established PDU sessions and/or a list of unsuccessfully established PDU sessions. This message can further contain a list of established DRBs in the PDU session and a list of unsuccessfully established DRBs. For the established DRBs, the message can further contain an indication that the target base station accepts the data forwarding. This message can further contain a list of established Qos flows in the PDU session and a list of unsuccessfully established Qos flows. For the established Qos flows, the message can further contain an indication that the target base station accepts the data forwarding.

Step 1004: The S-gNB transmits a handover command message to a UE.

In downlink, the source base station performs data forwarding according to the received data forwarding tunnel information. The source base station can perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is corresponding to each Qos flow, each DRB or each PDU session. Data not acknowledged by the UE and/or data allocated with a PDCP SN can be forwarded through a tunnel for each DRB. Fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. The data can also be transmitted to the target base station through a tunnel corresponding to each Qos flow.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data allocated with a PDCP SN, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session.

Step 1005: The S-gNB transmits a sequence number (SN) status transfer message to the T-gNB. The message contains downlink transmission and uplink reception status in the source gNB for data. This step may or may not be included in the present invention without affecting the main content of the present invention.

Step 1006: The UE transmits a handover completion message to the T-gNB.

Step 1007: The T-gNB transmits a path switch request message to an AMF.

Step 1007: The AMF transmits a PDU modification request message to the SMF. This message contains downlink user plane tunnel information allocated by the T-gNB.

Step 1009: The SMF transmits, to an UPF, the downlink user plane tunnel information allocated by the T-gNB and receives a response message from the UPF.

Step 1010: The SMF transmits a PDU modification response message to the AMF.

Step 1011: The AMF transmits a path switch request acknowledgement message to the T-gNB.

Step 1012: The T-gNB transmits a UE context release message to the S-gNB.

So far, the second method of the present invention has been described. By this method, uplink/downlink data forwarding can be supported, the loss of data can be avoided and the continuity of services can be ensured.

Figure 11:
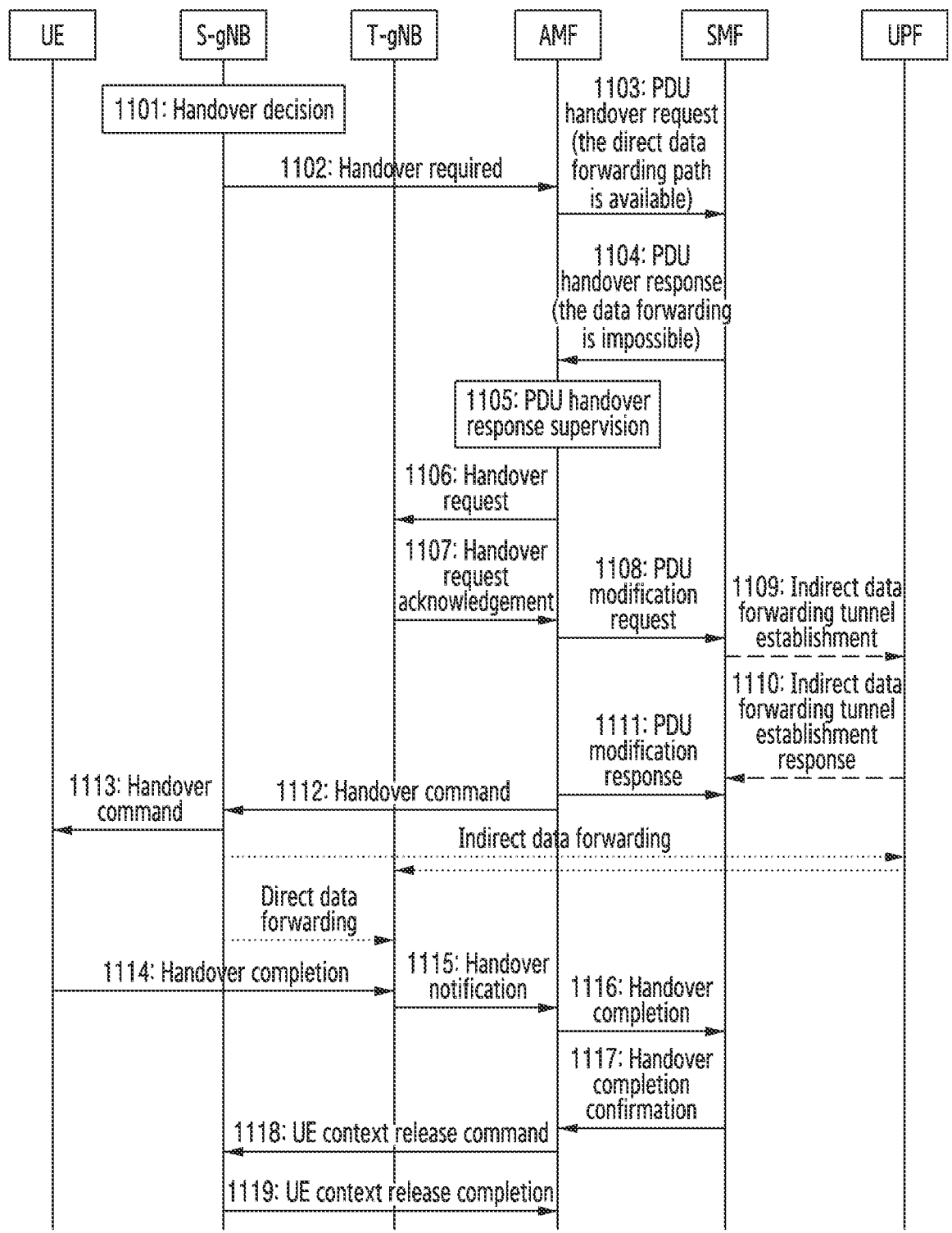
FIG. 11 is a schematic diagram of a third method for supporting handover according to the present invention.

FIG. 11 shows a third method according to the present invention. This embodiment will be described by taking both a source base station and a target base station being gNBs as example. Actually, this method is also suitable for a situation where the source base station is an eNB connected to the 5GC or the target base station is an eNB connected to the 5GC, and a base station connected to a 5GC may also be an ng-eNB. In this method, an SMF decides whether to use direct data forwarding or indirect data forwarding, or whether the data forwarding is possible. Here, the detailed description of steps irrelevant to the present invention has been omitted. This method comprises the following steps:

Step 1101: A source gNB (S-gNB) decides to initiate a handover to a UE.

Step 1102: The S-gNB transmits a handover required message to an AMF.

The source base station proposes downlink data forwarding. The downlink data forwarding proposed by the source base station is specific to a PDU session, and/or a Qos flow in a PDU session, and/or a DRB in a PDU session.

The message contains information about whether the direct data forwarding path is available. When the direct data forwarding path is available, the S-gNB can contain information indicating that the direct data forwarding path is available. Through the absence of the direct data forwarding path information element, the AMF knows that the direct data forwarding path is not available. The source base station can decide, based on the presence or absence of an Xn interface between the source base station and a target base station, whether the direct data forwarding path is available. Without influencing the main contents of the present invention, the source base station can also decide whether to perform direct data forwarding by considering other factors, for example, by considering the presence or absence of an IP connection between the source base station and the target base station.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-to-target transparent container or in a handover required message. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

Step 1103: The AMF transmits a PDU handover request message to an SMF. This message is specific to each PDU session for which an NG handover is request to be performed. This message contains a PDU session identifier and a target identifier. The message contains information indicating that the direct data forwarding path is available. The information indicating that the direct data forwarding path is available is received from the S-gNB.

Step 1104: The SMF transmits a PDU handover response message to the AMF. This message contains a PDU session identifier and information of Session Management (SM) at an NG-C interface. The SMF selects an UPF having an interface with a target gNB.

The SMF decides whether to use direct data forwarding or indirect data forwarding. The SMF decides, according to the received information indicating whether the direct data forwarding path is available, whether to use direct data forwarding or indirect data forwarding. The SMF can also decide, by considering other factors, whether to use direct data forwarding or indirect data forwarding, without influencing the main contents of the present invention. The SMF decides whether the data forwarding is possible. The feasibility of the data forwarding can be specific to each PDU session.

If the data forwarding is impossible, the SMF informs the AMF by the PDU handover response message. Or, the SMF transmits, by SM NG-C interface information, to a target gNB, the information indicating that data forwarding is impossible. The SMF informs, by the PDU handover response message, the AMF of the direct data forwarding or indirect data forwarding. Or, the SMF transmits the information about the direct data forwarding or indirect data forwarding to a target gNB through SM NG-C interface information. The PDU handover response message or the SM NG-C interface information in the PDU handover response message can further contain a PDU session identifier, the address of an uplink transport layer and a TEID allocated by the UPF at the NG-U interface, and/or Qos information.

Step 1105: The AMF detects the PDU handover response message of each SMF. When the AMF receives all PDU handover responses or the maximum waiting time arrives, the handover process is continuously executed.

Step 1106: The AMF transmits a handover request message to a target gNB (T-gNB). This message contains a source-to-target transparent container. This message contains the information of the SM, at the NG-C interface, received from the SMF in the step 604. This message contains information indicating that the data forwarding is impossible. The feasibility of the data forwarding can be specific to each PDU session. The information indicating that the data forwarding is impossible can be contained in the SM NG-C interface information. This message contains the direct data forwarding or indirect data forwarding. The AMF can inform the target base station of the direct data forwarding when the direct data forwarding is used. When there is no direct data forwarding in the handover request message, the target base station knows that the direct data forwarding is impossible. The information about the direct data forwarding or indirect data forwarding can be contained in the SM NG-C interface information. The handover request further contains information about a PDU session to be established. The information about a PDU session to be established contains a PDU session identifier. If this message contains the direct data forwarding or indirect data forwarding or absence of information element indicating that the data forwarding is impossible, it is indicated that the data forwarding is possible. For a certain PDU session, if there is no any information element indicating that the data forwarding is impossible, it is indicated that the data forwarding for the PDU session is possible. The handover request message contains a source-to-target transparent container. The information contained in the source-to-target transparent container is the same as that in the step 801 and will not be repeated in detail herein.

The T-gNB allocates data forwarding tunnel(s). If the data forwarding is possible and the T-gNB accepts the downlink data forwarding, the T-gNB allocates a downlink data forwarding tunnel. The T-gNB allocates a data forwarding tunnel for each Qos flow requiring data forwarding, each DRB requiring data forwarding and/or each PDU session requiring data forwarding. The specific allocation method can be the same as that in the step 804 and will not be repeated in detail herein. The T-gNB proposes uplink data forwarding and allocates an uplink data forwarding tunnel. The T-gNB allocates a data forwarding tunnel for each Qos flow proposing data forwarding and/or each DRB proposing data forwarding and/or each PDU session proposing data forwarding. The specific method can be the same as that in the step 804 and will not be repeated in detail herein.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message in the step 1107 and the handover command message in the step 1112.

Step 1107: The T-gNB transmits a handover request acknowledgement message to the AMF. This message contains the data forwarding tunnel information allocated by the target base station. This message contains a target-to-source transparent container. This message contains a list of established PDU sessions and/or a list of unsuccessfully established PDU sessions. For different data forwarding methods in the step 804, the data forwarding tunnel information can be specific to each PDU session, each Qos flow and/or each DRB. The data forwarding tunnel information can be contained in a target-to-source transparent container and/or a handover request acknowledgement message. The data forwarding tunnel information can be contained in the SM NG-C interface information. Preferably, the data forwarding tunnel information corresponding to the DRB can be contained in the target-to-source transparent container.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The target base station proposes UL data forwarding for per PDU session, and/or per Qos flow and/or per DRB. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein.

Step 1108: The AMF transmits a PDU modification request message to the SMF. This message contains the forwarding tunnel information allocated by the T-gNB. The forwarding tunnel information allocated by the T-gNB can be contained in the SM NG-C interface information and transparently transmitted to the SMF by the AMF. The AMF can transmit only the indirect data forwarding tunnel information to the SMF, or the direct data forwarding tunnel information can also be transmitted to the SMF. The AMF can transmit, by the PDU modification request message or another independent message to the SMF, the data forwarding tunnel information allocated by the T-gNB. The AMF can transmit only the indirect data forwarding tunnel information to the SMF, or the direct data forwarding tunnel information can also be transmitted to the SMF.

The SMF allocates indirect data forwarding tunnel information used between the S-gNB and an UPF, or the SMF requests an UPF to allocate indirect data forwarding tunnel information used between the S-gNB and the UPF. If the latter, steps 1109 and 1110 need to be executed. If the former, steps 1109 and 1110 may not be performed.

Step 1109: The SMF transmits an indirect data forwarding tunnel establishment message to the UPF, transmits the indirect data forwarding tunnel information allocated by the T-gNB to the UPF, and requests the UPF to allocate tunnel information used for data forwarding from the S-gNB to the UPF. The message can also be a session modification message between the SMF and the UPF. The SMF can request the UPF to establish an indirect data forwarding tunnel only when the indirect data forwarding is used.

The SMF transmits, to the UPF, the address of the downlink transport layer and the TEID allocated by the target gNB.

Step 1110: The UPF transmits an indirect data forwarding tunnel establishment response message to the SMF. This message can also be a session modification response message between the SMF and the UPF. This message contains the data forwarding tunnel information from the S-gNB to the UPF allocated by the UPF. The tunnel information can be specific to each PDU session, each Qos flow in each PDU session and/or each DRB in each PDU session.

Step 1111: The SMF transmits a PDU modification response message to the AMF. This message contains the data forwarding tunnel information from the S-gNB to the UPF allocated by the UPF. The SMF can transmit, by another independent message and to the AMF, the indirect data forwarding tunnel information allocated by the UPF. The data forwarding tunnel information from the S-gNB to the UPF allocated by the UPF can be contained in the SM NG-C interface information and transparently transmitted to the S-gNB by the AMF.

The SMF transmits, to the UPF, the address of the downlink transport layer and the TEID allocated by the target gNB.

Step 1112: The AMF transmits a handover command message to the S-gNB. This message contains a target-to-source transparent container. For the indirect data forwarding, the AMF transmits, to the source base station, the data forwarding tunnel information allocated by an UPF. If the UPF changes during a handover process, the AMF transmits, to the source base station, the data forwarding tunnel information allocated by the source UPF. The data forwarding tunnel information from the S-gNB to the UPF allocated by the UPF can be contained in the SM NG-C interface information and transparently transmitted to the S-gNB by the AMF. For a successfully established Qos flow, the message may also contain an indication that the target base station has accepted data forwarding for the Qos flow. For a successfully established DRB, the message may also contain an indication that the target base station has accepted data forwarding for the DRB. The message also contains Qos flow information that the target base station proposes uplink data forwarding or DRB information that the target base station proposes uplink data forwarding or PDU session information proposed for uplink data forwarding by the target base station. The information may be tunnel identifier information allocated for data forwarding or uplink data forwarding proposal information corresponding to a Qos flow or DRB.

Step 1113: The S-gNB transmits a handover command message to a UE.

The S-gNB forwards data to the target gNB.

In downlink, the source base station performs data forwarding according to the received data forwarding tunnel information. The source base station can perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is corresponding to each Qos flow, each DRB or each PDU session. The data forwarding can be direct data forwarding or indirect data forwarding. For the direct data forwarding, data not acknowledged by a UE and/or data allocated with a PDCP SN can be forwarded through a tunnel for each DRB. Fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the indirect data forwarding, the data is forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow and/or each DRB.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session. The data forwarding can be direct data forwarding or indirect data forwarding.

Step 1114: The UE transmits a handover completion message to the T-gNB.

Step 1115: The T-gNB transmits a handover notification message to the AMF.

Step 1116: The AMF transmits a handover completion message to the SMF. This message contains the PDU session identifier. This message is specific to each PDU session.

Step 1117: The SMF transmits a handover completion acknowledgement message to the AMF. The SMF needs to inform the selected UPF of information indicating that the downlink user plane tunnel is handed over to the T-gNB, that is, the downlink tunnel information allocated by the T-gNB. The downlink tunnel information contains the address of the transport layer and the TEID.

Step 1118: The AMF transmits a UE context release command message to the S-gNB.

Step 1119: The S-gNB transmits a UE context release completion message to the AMF.

So far, the third method of the present invention has been described. By the method in this embodiment, different data forwarding methods can be supported, the loss of data can be avoided and the continuity of services can be ensured. By this method, the transparent transport of SM NG-C information between a base station and an SMF by an AMF can also be supported.

Figure 12:
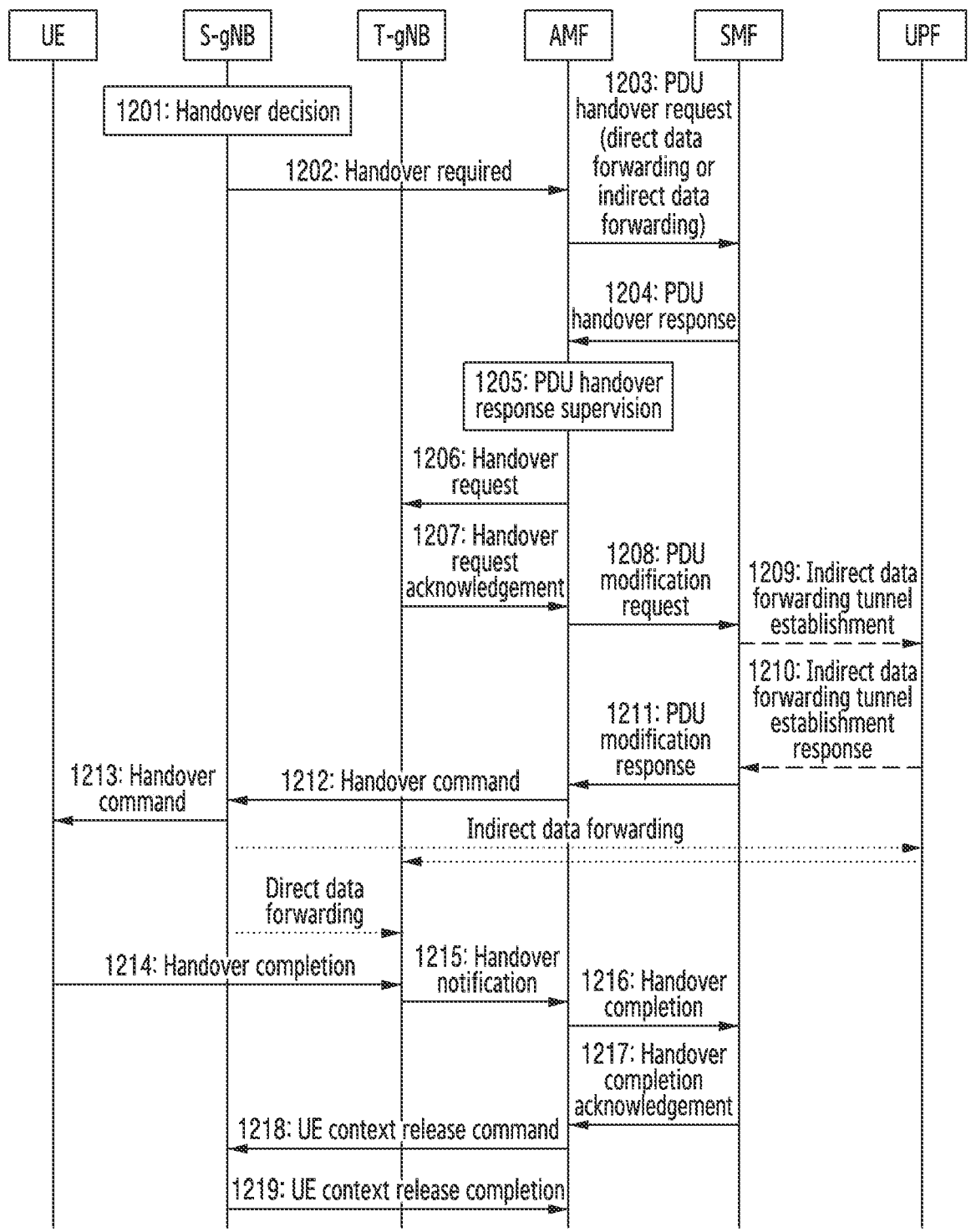
FIG. 12 is a schematic diagram of a fourth method for supporting handover according to the present invention.

FIG. 12 shows a fourth method according to the present invention. This embodiment will be described by taking both a source base station and a target base station being gNBs as example. Actually, this method is also suitable for a situation where the source base station is an eNB connected to the 5GC or the target base station is an eNB connected to the 5GC, and a base station connected to a 5GC may also be an ng-eNB. In this embodiment, an AMF decides whether to use direct data forwarding or indirect data forwarding. The SMF decides whether the data forwarding is possible. Here, the detailed description of steps irrelevant to the present invention has been omitted. This method comprises the following steps:

Step 1201: A source gNB (S-gNB) decides to initiate a handover to a UE.

Step 1202: The S-gNB transmits a handover required message to an AMF.

The source base station proposes downlink data forwarding. The downlink data forwarding proposed by the source base station is specific to a PDU session, and/or a Qos flow in a PDU session, and/or a DRB in a PDU session.

The message contains information about whether the direct data forwarding path is available. When the direct data forwarding path is available, the S-gNB can contain information indicating that the direct data forwarding path is available. Through the absence of the direct data forwarding path information element, the AMF knows that the direct data forwarding path is not available. The source base station can decide, based on the presence or absence of an Xn interface between the source base station and a target base station, whether the direct data forwarding path is available. Without influencing the main contents of the present invention, the source base station can also decide whether the direct data forwarding path is available, by considering other factors, for example, by considering the presence or absence of an IP connection between the source base station and a target base station.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-to-target transparent container or in a handover required message. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

Step 1203: The AMF transmits a PDU handover request message to an SMF. This message is specific to each PDU session on which an NG handover is request to be performed. This message contains a PDU session identifier and a target identifier.

The AMF decides whether to use direct data forwarding or indirect data forwarding. The AMF decides, according to the received information indicating whether the direct data forwarding path is available, whether to use direct data forwarding or indirect data forwarding. The AMF can also decide, by considering other factors, whether to use direct data forwarding or indirect data forwarding, without influencing the main contents of the present invention. The direct data forwarding or indirect data forwarding is specific to all PDU sessions of the UE.

The AMF transmits information about the direct data forwarding or indirect data forwarding to an SMF.

Step 1204: The SMF transmits a PDU handover response message to the AMF. This message contains a PDU session identifier and information of Session Management (SM) at an NG-C interface. The SMF selects an UPF having an interface with a target gNB. The SMF decides whether the data forwarding is possible. The SMF decides whether the data forwarding corresponding to each PDU session is possible. The SMF can decide, according to the information about the direct data forwarding or indirect data forwarding received from the AMF, whether the data forwarding is possible. If the direct data forwarding is used, the data forwarding is possible; and, if the indirect data forwarding is used, the SMF decides, by considering a network topology, whether the data forwarding is possible.

If the data forwarding is impossible, the SMF informs the AMF by the PDU handover response message. Or, the SMF transmits, by SM NG-C interface information and to a target gNB, the information indicating that data forwarding is impossible. The information indicating that the data forwarding is impossible is specific to each PDU session. Since the SMF for each PDU session may be different and the UPF selected for each PDU session by the SMF may also be different, the feasibility of the data forwarding is specific to each PDU session.

The PDU handover response message or the SM NG-C interface information in the PDU handover response message can further contain a PDU session identifier, the address of an uplink transport layer and a TEID allocated by the UPF at the NG-U interface, and/or Qos information.

Step 1205: The AMF detects the PDU handover response message from each SMF. When the AMF receives all PDU handover responses or the maximum waiting time arrives, the handover process is continuously executed.

Step 1206: The AMF transmits a handover request message to a target gNB (T-gNB). This message contains a source-to-target transparent container. This message contains the information of the SM, at the NG-C interface, received from the SMF in the step 1204. This message contains information indicating that the data forwarding is impossible. The information indicating that the data forwarding is impossible can be contained in the SM NG-C interface information. The information indicating that the data forwarding is impossible is specific to each PDU session. This message contains the direct data forwarding or indirect data forwarding. The AMF can inform the target base station of the direct data forwarding when the direct data forwarding is used. When there is no direct data forwarding in the handover request message, the target base station knows that the direct data forwarding is impossible. The handover request further contains information about a PDU session to be established. The information about a PDU session to be established contains a PDU session identifier. If this message contains the direct data forwarding or indirect data forwarding or absence of information element indicating that the data forwarding is impossible, it is indicated that the data forwarding is possible. For a certain PDU session, if there is no any information element indicating that the data forwarding is impossible, it is indicated that the data forwarding for the PDU session is possible. The handover request message contains a source-to-target transparent container. The information contained in the source-to-target transparent container is the same as that in the step 801 and will not be repeated in detail herein.

The T-gNB allocates data forwarding tunnels. If the data forwarding is possible and the T-gNB accepts the downlink data forwarding, the T-gNB allocates a downlink data forwarding tunnel. The T-gNB allocates a data forwarding tunnel for each Qos flow requiring data forwarding, each DRB requiring data forwarding and/or each PDU session requiring data forwarding. The specific allocation method can be the same as that in the step 804 and will not be repeated in detail herein. The T-gNB proposes uplink data forwarding and allocates an uplink data forwarding tunnel. The T-gNB allocates a data forwarding tunnel for each Qos flow proposing data forwarding and/or each DRB proposing data forwarding and/or each PDU session proposing data forwarding. The specific method can be the same as that in the step 804 and will not be repeated in detail herein.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message in the step 1207 and the handover command message in the step 1212.

Step 1207: The T-gNB transmits a handover request acknowledgement message to the AMF. This message contains the data forwarding tunnel information allocated by the target base station. This message contains a target-to-source transparent container. This message contains a list of established PDU sessions and/or a list of unsuccessfully established PDU sessions. For different data forwarding methods in the step 804, the data forwarding tunnel information can be specific to each PDU session, each Qos flow and/or each DRB. The data forwarding tunnel information can be contained in a target-to-source transparent container and/or a handover request acknowledgement message. The data forwarding tunnel information can be contained in the SM NG-C interface information. Preferably, the data forwarding tunnel information corresponding to the DRB can be contained in the target-to-source transparent container.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The target base station proposes UL data forwarding for per PDU session, and/or per Qos flow and/or per DRB. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein.

Step 1208: The AMF transmits a PDU modification request message to the SMF. This message contains the forwarding tunnel information allocated by the T-gNB. The forwarding tunnel information allocated by the T-gNB can be contained in the SM NG-C interface information and transparently transmitted to the SMF by the AMF. This message can further contain the information about the direct data forwarding or indirect data forwarding. The AMF also can transmit only the indirect data forwarding tunnel information to the SMF, or the direct data forwarding tunnel information can also be transmitted to the SMF. The AMF can transmit, by the PDU modification request message or another single message and to the SMF, the data forwarding tunnel information allocated by the T-gNB.

The SMF allocates indirect data forwarding uplink tunnel information used between the S-gNB and an UPF, or the SMF requests an UPF to allocate indirect data forwarding uplink tunnel information used between the S-gNB and the UPF. If the latter, steps 1209 and 1210 need to be executed. If the former, steps 1209 and 1210 may not be performed.

Step 1209: The SMF transmits an indirect data forwarding tunnel establishment message to the UPF, transmits the indirect data forwarding tunnel information allocated by the T-gNB to the UPF, and requests the UPF to allocate tunnel information used for data forwarding from the S-gNB to the UPF. The message can also be a session modification message between the SMF and the UPF. The SMF can request the UPF to establish an indirect data forwarding tunnel only when receiving the indirect data forwarding tunnel information allocated by the T-gNB.

The SMF transmits, to the UPF, the address of the downlink transport layer and the TEID allocated by the target gNB.

Step 1210: The UPF transmits an indirect data forwarding tunnel establishment response message to the SMF. This message can also be a session modification response message between the SMF and the UPF. This message contains the data forwarding tunnel information from the S-gNB to the UPF allocated by the UPF. The tunnel information can be specific to each PDU session, each Qos flow in each PDU session and/or each DRB in each PDU session.

Step 1211: The SMF transmits a PDU modification response message to the AMF. This message contains the data forwarding tunnel information from the S-gNB to the UPF allocated by the UPF. The SMF can transmit, by another single message and to the AMF, the indirect data forwarding tunnel information allocated by the UPF. The data forwarding tunnel information from the S-gNB to the UPF allocated by the UPF can be contained in the SM NG-C interface information and transparently transmitted to the S-gNB by the AMF.

The SMF transmits, to the UPF, the address of the downlink transport layer and the TEID allocated by the target gNB.

Step 1212: The AMF transmits a handover command message to the S-gNB. This message contains a target-to-source transparent container. For the indirect data forwarding, the AMF transmits, to the source base station, the data forwarding tunnel information allocated by an UPF. If the UPF changes during a handover process, the AMF transmits, to the source base station, the data forwarding tunnel information allocated by the source UPF. The data forwarding tunnel information from the S-gNB to the UPF allocated by the UPF can be contained in the SM NG-C interface information and transparently transmitted to the S-gNB by the AMF. For a successfully established Qos flow, the message may also contain an indication that the target base station has accepted data forwarding for the Qos flow. For a successfully established DRB, the message may also contain an indication that the target base station has accepted data forwarding for the DRB. The message also contains Qos flow information that the target base station proposes uplink data forwarding or DRB information that the target base station proposes uplink data forwarding or PDU session information proposed for uplink data forwarding by the target base station. The information may be tunnel identifier information allocated for data forwarding or uplink data forwarding proposal information corresponding to a Qos flow or DRB.

Step 1213: The S-gNB transmits a handover command message to a UE.

The S-gNB forwards data to the target gNB.

In downlink, the source base station performs data forwarding according to the received data forwarding tunnel information. The source base station can perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is corresponding to each Qos flow, each DRB or each PDU session. The data forwarding can be direct data forwarding or indirect data forwarding. For the direct data forwarding, data not acknowledged by a UE and/or data allocated with a PDCP SN can be forwarded through a tunnel for each DRB. Corresponding fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the indirect data forwarding, the data is forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow and/or each DRB.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session. The data forwarding can be direct data forwarding or indirect data forwarding.

Step 1214: The UE transmits a handover completion message to the T-gNB.

Step 1215: The T-gNB transmits a handover notification message to the AMF.

Step 1216: The AMF transmits a handover completion message to the SMF. This message contains the PDU session identifier. This message is specific to each PDU session.

Step 1217: The SMF transmits a handover completion acknowledgement message to the AMF. The SMF needs to inform the selected UPF of information indicating that the downlink user plane tunnel is handed over to the T-gNB, that is, the downlink tunnel information allocated by the T-gNB. The downlink tunnel information contains the address of the transport layer and the TEID.

Step 1218: The AMF transmits a UE context release command message to the S-gNB.

Step 1219: The S-gNB transmits a UE context release completion message to the AMF.

So far, the fourth method of the present invention has been described. By the method in this embodiment, different data forwarding methods can be supported, the loss of data can be avoided and the continuity of services can be ensured. By this method, the transparent transport of SM NG-C information between a base station and an SMF by an AMF can also be supported.

Figure 13:
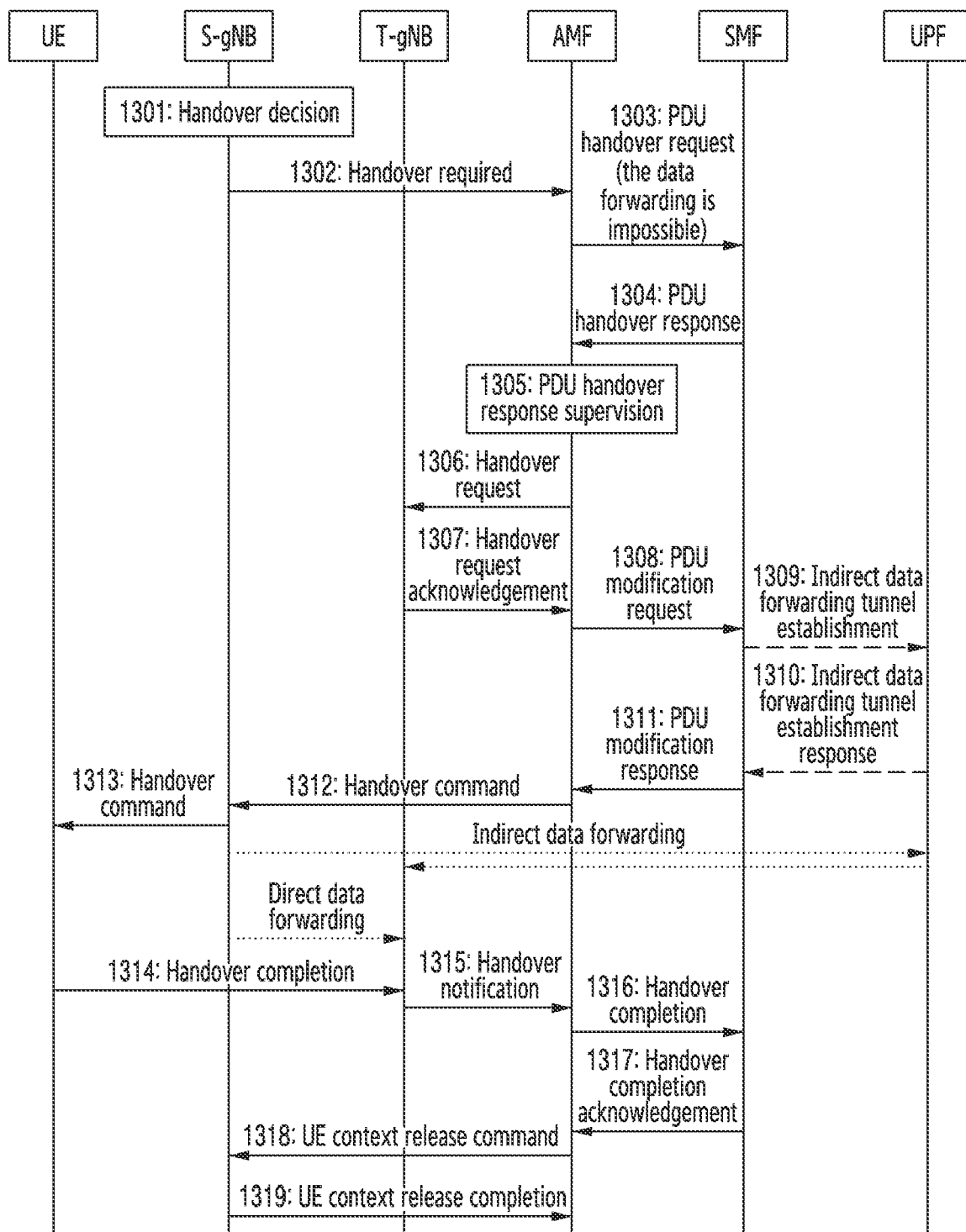
FIG. 13 is a schematic diagram of a fifth method for supporting handover according to the present invention.

FIG. 13 shows a fifth method according to the present invention. This embodiment will be described by taking both a source base station and a target base station being gNBs as example. Actually, this method is also suitable for a situation where the source base station is an eNB connected to the 5GC or the target base station is an eNB connected to the 5GC, and a base station connected to a 5GC may also be an ng-eNB. In this method, an AMF decides whether to use direct data forwarding or indirect data forwarding, and whether the data forwarding is possible. Here, the detailed description of steps irrelevant to the present invention has been omitted. This method comprises the following steps:

Step 1301: A source gNB (S-gNB) decides to initiate a handover to a UE.

Step 1302: The S-gNB transmits a handover required message to an AMF.

The source base station proposes downlink data forwarding. The downlink data forwarding proposed by the source base station is specific to a PDU session, and/or a Qos flow in a PDU session, and/or a DRB in a PDU session.

The message contains information about whether the direct data forwarding path is available. When the direct data forwarding path is available, the S-gNB can contain information indicating that the direct data forwarding path is available. Through the absence of the direct data forwarding path information element, the AMF knows that the direct data forwarding path is not available. The source base station can decide, based on the presence or absence of an Xn interface between the source base station and a target base station, whether the direct data forwarding path is available. Without influencing the main contents of the present invention, the source base station can also decide whether the direct data forwarding path is available, by considering other factors, for example, by considering the presence or absence of an IP connection between the source base station and a target base station.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-to-target transparent container or in a handover required message. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

As another method of this embodiment, a list of PDU session information of the UE can be contained in the handover required message. The PDU session information of the UE is the same as that in the step 902 and will not be repeated in detail herein. In this method, the steps 1303, 1304 and 1305 may not be executed.

Step 1303: The AMF transmits a PDU handover request message to an SMF. This message is specific to each PDU session on which an NG handover is request to be performed. This message contains a PDU session identifier and a target identifier.

The AMF decides whether to use direct data forwarding or indirect data forwarding. The AMF decides, according to the received information indicating whether the direct data forwarding path is available, whether to use direct data forwarding or indirect data forwarding. The AMF can also decide, by considering other factors, whether to use direct data forwarding or indirect data forwarding, without influencing the main contents of the present invention. The direct data forwarding or indirect data forwarding is specific to all PDU sessions of the UE. The AMF decides whether the data forwarding is possible. The feasibility of the data forwarding is specific to each PDU session. The AMF can decide, according to the information about the direct data forwarding or indirect data forwarding received from the AMF, whether the data forwarding is possible. If the direct data forwarding is used, the data forwarding is possible; and, if the indirect data forwarding is used, the AMF decides, by considering a network topology, whether the data forwarding is possible.

The AMF transmits information about the direct data forwarding or indirect data forwarding to an SMF.

If the data forwarding is impossible, the AMF informs the SMF of the information indicating that the data forwarding is impossible. The infeasibility of the data forwarding is specific to each PDU session. Only when the data forwarding is possible, the AMF informs the SMF of the information about the direct data forwarding or indirect data forwarding.

Step 1304: The SMF transmits a PDU handover response message to the AMF. This message contains a PDU session identifier and information of Session Management (SM) at an NG-C interface. The SMF selects an UPF having an interface with a target gNB.

If the data forwarding is impossible, the SMF transmits, by SM NG-C interface and to a target gNB, the information indicating that the data forwarding is impossible. The information indicating that the data forwarding is impossible is specific to each PDU session. Since the SMF for each PDU session may be different and the UPF selected for each PDU session by the SMF may also be different, the feasibility of the data forwarding is specific to each PDU session.

The PDU handover response message or the SM NG-C interface information in the PDU handover response message can further contain a PDU session identifier, the address of an uplink transport layer and a TEID allocated by the UPF at the NG-U interface, and/or Qos information.

Step 1305: The AMF detects the PDU handover response message from each SMF. When the AMF receives all PDU handover responses or the maximum waiting time arrives, the handover process is continuously executed.

Step 1306: The AMF transmits a handover request message to a target gNB (T-gNB). This message contains a source-to-target transparent container. This message contains the information of the SM, at the NG-C interface, received from the SMF in the step 804. This message contains information indicating that the data forwarding is impossible. The information indicating that the data forwarding is impossible can be contained in the SM NG-C interface information. The information indicating that the data forwarding is impossible is specific to each PDU session. This message contains the direct data forwarding or indirect data forwarding. The AMF can inform the target base station of the direct data forwarding when the direct data forwarding is used. When there is no direct data forwarding in the handover request message, the target base station knows that the direct data forwarding is impossible. The handover request further contains information about a PDU session to be established. The information about a PDU session to be established contains a PDU session identifier. If this message contains the direct data forwarding or indirect data forwarding or absence of information element indicating that the data forwarding is impossible, it is indicated that the data forwarding is possible. For a certain PDU session, if there is no any information element indicating that the data forwarding is impossible, it is indicated that the data forwarding for the PDU session is possible. The handover request message contains a source-to-target transparent container. The information contained in the source-to-target transparent container is the same as that in the step 801 and will not be repeated in detail herein.

The T-gNB allocates data forwarding tunnels. If the data forwarding is possible and the T-gNB accepts the downlink data forwarding, the T-gNB allocates a downlink data forwarding tunnel. The T-gNB allocates a data forwarding tunnel for each Qos flow requiring data forwarding, each DRB requiring data forwarding and/or each PDU session requiring data forwarding. The specific allocation method can be the same as that in the step 804 and will not be repeated in detail herein. The T-gNB proposes uplink data forwarding and allocates an uplink data forwarding tunnel. The T-gNB allocates a data forwarding tunnel for each Qos flow proposing data forwarding and/or each DRB proposing data forwarding and/or each PDU session proposing data forwarding. The specific method can be the same as that in the step 804 and will not be repeated in detail herein.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message in the step 1307 and the handover command message in the step 1312.

Step 1307: The T-gNB transmits a handover request acknowledgement message to the AMF. This message contains the data forwarding tunnel information allocated by the target base station. This message contains a target-to-source transparent container. This message contains a list of established PDU sessions and/or a list of unsuccessfully established PDU sessions. For different data forwarding methods in the step 804, the data forwarding tunnel information can be specific to each PDU session, each Qos flow and/or each DRB. The data forwarding tunnel information can be contained in a target-to-source transparent container and/or a handover request acknowledgement message. The data forwarding tunnel information can be contained in the SM NG-C interface information. Preferably, the data forwarding tunnel information corresponding to the DRB can be contained in the target-to-source transparent container.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The target base station proposes UL data forwarding for per PDU session, and/or per Qos flow and/or per DRB. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein.

Step 1308: The AMF transmits a PDU modification request message to the SMF. This message contains the forwarding tunnel information allocated by the T-gNB. The forwarding tunnel information allocated by the T-gNB can be contained in the SM NG-C interface information and transparently transmitted to the SMF by the AMF. This message can further contain the information about the direct data forwarding or indirect data forwarding. The AMF also can transmit only the indirect data forwarding tunnel information to the SMF, or the direct data forwarding tunnel information can also be transmitted to the SMF. The AMF can transmit, by the PDU modification request message or another single message and to the SMF, the data forwarding tunnel information allocated by the T-gNB.

The SMF allocates indirect data forwarding uplink tunnel information used between the S-gNB and an UPF, or the SMF requests an UPF to allocate indirect data forwarding uplink tunnel information used between the S-gNB and the UPF. If the latter, steps 1309 and 1310 need to be executed. If the former, steps 1309 and 1310 may not be performed.

Step 1309: The SMF transmits an indirect data forwarding tunnel establishment message to the UPF, transmits the indirect data forwarding tunnel information allocated by the T-gNB to the UPF, and requests the UPF to allocate tunnel information used for data forwarding from the S-gNB to the UPF. The message can also be a session modification message between the SMF and the UPF. The SMF can request the UPF to establish an indirect data forwarding tunnel only when receiving the indirect data forwarding tunnel information allocated by the T-gNB.

The SMF transmits, to the UPF, the address of the downlink transport layer and the TEID allocated by the target gNB.

Step 1310: The UPF transmits an indirect data forwarding tunnel establishment response message to the SMF. This message can also be a session modification response message between the SMF and the UPF. This message contains the data forwarding tunnel information from the S-gNB to the UPF allocated by the UPF. The tunnel information can be specific to each PDU session, each Qos flow in each PDU session and/or each DRB in each PDU session.

Step 1311: The SMF transmits a PDU modification response message to the AMF. This message contains the data forwarding tunnel information from the S-gNB to the UPF allocated by the UPF. The SMF can transmit, by another single message and to the AMF, the indirect data forwarding tunnel information allocated by the UPF. The data forwarding tunnel information from the S-gNB to the UPF allocated by the UPF can be contained in the SM NG-C interface information and transparently transmitted to the S-gNB by the AMF.

The SMF transmits, to the UPF, the address of the downlink transport layer and the TEID allocated by the target gNB.

Step 1312: The AMF transmits a handover command message to the S-gNB. This message contains a target-to-source transparent container. For the indirect data forwarding, the AMF transmits, to the source base station, the data forwarding tunnel information allocated by an UPF. If the UPF changes during a handover process, the AMF transmits, to the source base station, the data forwarding tunnel information allocated by the source UPF. The data forwarding tunnel information from the S-gNB to the UPF allocated by the UPF can be contained in the SM NG-C interface information and transparently transmitted to the S-gNB by the AMF. For a successfully established Qos flow, the message may also contain an indication that the target base station has accepted data forwarding for the Qos flow. For a successfully established DRB, the message may also contain an indication that the target base station has accepted data forwarding for the DRB. The message also contains Qos flow information that the target base station proposes uplink data forwarding or DRB information that the target base station proposes uplink data forwarding or PDU session information proposed for uplink data forwarding by the target base station. The information may be tunnel identifier information allocated for data forwarding or uplink data forwarding proposal information corresponding to a Qos flow or DRB.

Step 1313: The S-gNB transmits a handover command message to a UE.

The S-gNB forwards data to the target gNB.

In downlink, the source base station performs data forwarding according to the received data forwarding tunnel information. The source base station can perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is corresponding to each Qos flow, each DRB or each PDU session. The data forwarding can be direct data forwarding or indirect data forwarding. For the direct data forwarding, data not acknowledged by a UE and/or data allocated with a PDCP SN can be forwarded through a tunnel for each DRB. Corresponding fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the indirect data forwarding, the data is forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow and/or each DRB.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session. The data forwarding can be direct data forwarding or indirect data forwarding.

Step 1314: The UE transmits a handover completion message to the T-gNB.

Step 1315: The T-gNB transmits a handover notification message to the AMF.

Step 1316: The AMF transmits a handover completion message to the SMF. This message contains the PDU session identifier. This message is specific to each PDU session.

Step 1317: The SMF transmits a handover completion acknowledgement message to the AMF. The SMF needs to inform the selected UPF of information indicating that the downlink user plane tunnel is handed over to the T-gNB, that is, the downlink tunnel information allocated by the T-gNB. The downlink tunnel information contains the address of the transport layer and the TEID.

Step 1318: The AMF transmits a UE context release command message to the S-gNB.

Step 1319: The S-gNB transmits a UE context release completion message to the AMF.

So far, the fifth method of the present invention has been described. By the method in this embodiment, different data forwarding methods can be supported, the loss of data can be avoided and the continuity of services can be ensured. By this method, the transparent transport of SM NG-C information between a base station and an SMF by an AMF can also be supported.

Figure 14:
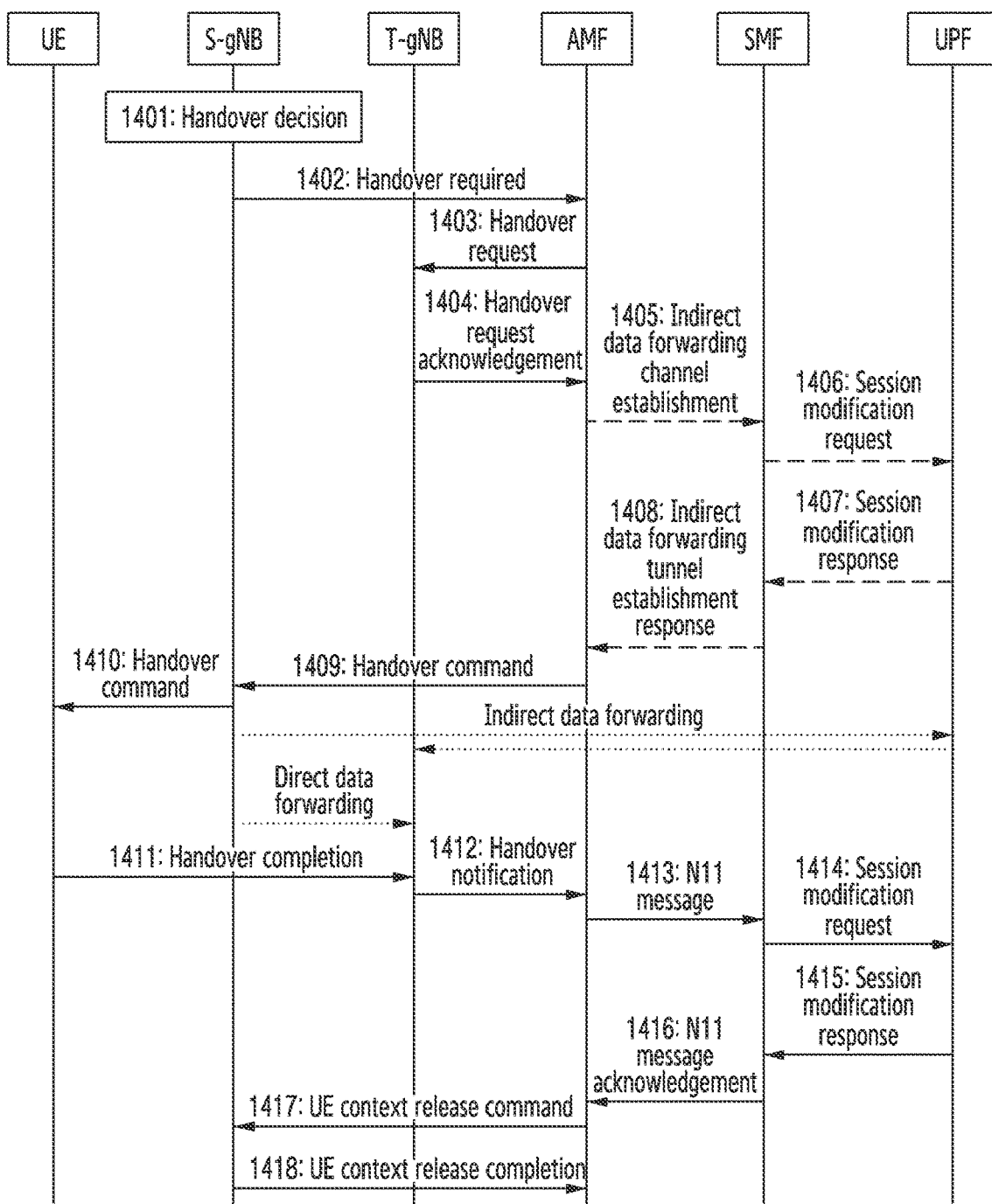
FIG. 14 is a schematic diagram of a sixth method for supporting handover according to the present invention.

FIG. 14 shows a schematic diagram of a sixth method of the present invention. This embodiment will be described by taking both a source base station and a target base station being gNBs as example. Actually, this method is also suitable for a situation where the source base station is an eNB connected to the 5GC or the target base station is an eNB connected to the 5GC, and a base station connected to a 5GC may also be an ng-eNB. Here, the detailed description of steps irrelevant to the present invention has been omitted. This method comprises the following steps:

Step 1401: A source gNB (S-gNB) decides to initiate a handover to a UE.

Step 1402: The S-gNB transmits a handover required message to an AMF.

The source base station proposes downlink data forwarding. The downlink data forwarding proposed by the source base station is specific to a PDU session, and/or a Qos flow in a PDU session, and/or a DRB in a PDU session.

The message contains information about whether the direct data forwarding path is available. When the direct data forwarding path is available, the S-gNB can contain information indicating that the direct data forwarding path is available. Through the absence of the direct data forwarding path information element, the AMF knows that the direct data forwarding path is not available. The source base station can decide, based on the presence or absence of an Xn interface between the source base station and a target base station, whether the direct data forwarding path is available. Without influencing the main contents of the present invention, the source base station can also decide whether to perform direct data forwarding by considering other factors, for example, by considering the presence or absence of an IP connection between the source base station and the target base station.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-to-target transparent container or in a handover required message. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

The handover required message contains an identifier of a target base station. The handover required message can further contain an identifier of a target cell and a Tracking Area Identifier (TAI) of the target cell.

The S-gNB decides whether the target base station is connected to a 5GC base station or connected to an Evolved Partition Core Network (EPC). If the target base station is an LTE eNB, the eNB can be connected to an EPC or a 5GC.

The source base station can know, by the following ways, whether the eNB supports an interface to the 5GC.

Way 1: The eNB broadcasts whether it supports an interface to the 5GC.

A UE reads the broadcast information of the eNB, and transmits, to a serving base station (e.g., a gNB) of the UE, information indicating whether a neighboring base station supports the interface to the 5GC.

Way 2: Through the establishment process of an interface between a gNB and an eNB, the eNB informs the gNB whether it supports an interface to the 5G core network.

Way 3: Through an O&M configuration, a gNB knows whether an eNB supports an interface to the 5G core network.

The handover required message can contain a list of PDU session information of the UE. The PDU session information of the UE is the same as that in the step 902 and will not be repeated in detail herein. If the target base station is connected to the 5GC, the handover required message can contain the list of PDU session information of the UE. If the target base station is connected to the EPC, the handover required message may not contain the list of PDU session information of the UE.

The gNB informs the AMF of a handover type. The handover type includes a handover inside NR, a handover from NR to LTE, a handover from NR to UTRAN and a handover from NR to GERAN and/or GSM. For the handover from NR to LTE, a 5G-RAN informs a 5GC CP whether the handed-over target base station is a base station connected to the 5G core network or whether this handover is a handover between different systems. An LTE eNB may support an interface to the 5GC, or may not support an interface to the 5GC. If the target base station is also connected to the 5GC, the handover is a handover inside the 5G system. If the target base station is connected to the EPC but not connected to the 5GC, the handover is a handover between different systems. The gNB can inform the AMF that this handover is a handover between different systems through information about an inter-system handover or information indicating that there is no interface between the target base station and the 5GC, which being in the handover required message. If an identifier of an eNB connected to the 5GC and an identifier of an eNB not connected to the 5GC are different in length, the AMF can determine, according to the length of the identifier of the target base station contained in the received handover required message, whether the handover is a handover between different systems. Or, the gNB sets the handover type in the handover required message as a handover from the NR to an eNB connected to the EPC or a handover from the NR to an eNB connected to the 5GC, so as to inform the AMF of the handover type. The handover type indicates the core network to which the target eNB is connected is an EPC or a 5GC. If the core network is a 5GC, the handover is an intra-system handover. If the core network is an EPC, the handover is a handover between different systems.

Step 1403: The AMF transmits a handover request message to a target gNB (T-gNB). This message contains a source-to-target transparent container. This message contains a list of PDU session information. The PDU session information is the same as that in the step 1402 and will not be repeated in detail herein.

The AMF decides whether to use direct data forwarding or indirect data forwarding. The AMF decides, according to the information indicating whether the direct data forwarding path is available received from the S-gNB, whether to use direct data forwarding or indirect data forwarding. The AMF can also decide, by considering other factors, whether to use direct data forwarding or indirect data forwarding, without influencing the main contents of the present invention. The AMF decides whether the data forwarding is possible. The infeasibility of the data forwarding can be specific to each PDU session. For a handover between different AMFs, if a source AMF decides to use direct data forwarding, the source AMF informs a target AMF of information about the direct data forwarding. The source AMF informs the target AMF of information indicating whether the data forwarding is possible.

This handover request message contains the direct data forwarding or indirect data forwarding. The AMF can inform the target base station of the direct data forwarding when the direct data forwarding is used. When there is no direct data forwarding in the handover request message, the target base station knows that the direct data forwarding is impossible. This message contains information indicating that the data forwarding is impossible. The infeasibility of the data forwarding can be specific to each PDU session. If this message contains the direct data forwarding or indirect data forwarding or absence of information element indicating that the data forwarding is impossible, it is indicated that the data forwarding is possible. For a certain PDU session, if there is no any information element indicating that the data forwarding is impossible, it is indicated that the data forwarding for the PDU session is possible. The handover request message contains a source-to-target transparent container. The information contained in the source-to-target transparent container is the same as that in the step 801 and will not be repeated in detail herein.

A specific method for allocating data forwarding tunnels by the T-gNB is the same as that in the step 804 and will not be repeated in detail herein. A specific method for proposing, by the T-gNB, uplink data forwarding and allocating uplink data forwarding tunnels is the same as that in the step 804 and will not be repeated here.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message in the step 907 and the handover command message in the step 912.

Step 1404: The T-gNB transmits a handover request acknowledgement message to the AMF. This message contains the data forwarding tunnel information allocated by the target base station. This message contains a target-to-source transparent container. This message contains a list of established PDU sessions and/or a list of unsuccessfully established PDU sessions. For an established PDU session, this message contains successfully established Qos flows and unsuccessfully established Qos flows. For different data forwarding methods in the step 804, the data forwarding tunnel information can be specific to each PDU session, each Qos flow and/or each DRB. The data forwarding tunnel information can be contained in a target-to-source transparent container and/or a handover request acknowledgement message. Preferably, the data forwarding tunnel information corresponding to the DRB can be contained in the target-to-source transparent container.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The target base station proposes UL data forwarding for per PDU session, and/or per Qos flow and/or per DRB. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein.

Step 1405: The AMF transmits an indirect data forwarding tunnel establishment message to an SMF. The SMF is a temporary SMF selected for performing data forwarding, a certain SMF serving the UE, or an SMF corresponding to each PDU session requiring data forwarding. The indirect data forwarding tunnel establishment message contains the PDU session information that the data forwarding is accepted by the target base station The PDU session information contains the PDU session identifier, the downlink data forwarding tunnel information allocated by the target base station and/or the tunnel information of the uplink data forwarding proposed by the target base station. The PDU session information can further contain Qos flow information accepted by the target base station and/or failed Qos flow information in the PDU session. The accepted Qos flow information contains the Qos flow identifier, the downlink data forwarding tunnel information allocated to the Qos flow by the target base station and/or the tunnel information allocated to the Qos flow during the uplink data forwarding proposed by the target base station. During the indirect data forwarding, for the PDU session accepted by the target base station, if at least one accepted Qos flow requires data forwarding, the AMF requests the SMF to establish an indirect data forwarding tunnel.

The steps 1405 to 1408 are executed only during the indirect data forwarding. For the direct data forwarding, the AMF will transmit, in the step 1409 and to the source base station, the data forwarding tunnel information received from the target base station.

Step 1406: The SMF transmits a session modification request message to an UPF. The SMF transmits, to the UPF, the indirect data forwarding tunnel information allocated by the T-gNB, and requests the UPF to allocate tunnel information used for data forwarding from the S-gNB to the UPF. This message can also be a session establishment request message between the SMF and the UPF. The UPF is a temporary UPF selected for performing data forwarding, a certain UPF serving the UE, or an UPF corresponding to each PDU session requiring data forwarding. For the UPF corresponding to each PDU session requiring data forwarding, the UPF can be a source UPF or a target UPF, and the target UPF is specific to a situation that the UPF is repositioned. If the UPF is a temporary UPF selected for performing data forwarding, the SMF selects an UPF having an interface to the target gNB.

Step 1407: The UPF transmits a session modification response message to the SMF. This message can also be a session establishment response message between the SMF and the UPF. This message contains the data forwarding tunnel information from the S-gNB to the UPF allocated by the UPF. The tunnel information contains a tunnel identifier and an address of a transport layer. The tunnel information can be specific to each PDU session and/or each Qos flow in each PDU session. The tunnel information can also be specific to a DRB.

Step 1408: The SMF transmits an indirect data forwarding tunnel establishment response message to the AMF. This message contains a PDU session identifier and information of Session Management (SM) at an NG-C interface. This message contains the data forwarding tunnel information from the S-gNB to the UPF allocated by the UPF.

Step 1409: The AMF transmits a handover command message to the S-gNB. This message contains a target-to-source transparent container. For the indirect data forwarding, the AMF transmits, to the source base station, the data forwarding tunnel information allocated by an UPF. If the UPF changes during a handover process, the AMF transmits, to the source base station, the data forwarding tunnel information allocated by the source UPF. For a successfully established Qos flow, the message may also contain an indication that the target base station has accepted data forwarding for the Qos flow. For a successfully established DRB, the message may also contain an indication that the target base station has accepted data forwarding for the DRB. The message also contains Qos flow information that the target base station proposes uplink data forwarding or DRB information that the target base station proposes uplink data forwarding or PDU session information proposed for uplink data forwarding by the target base station. The information may be tunnel identifier information allocated for data forwarding or uplink data forwarding proposal information corresponding to a Qos flow or DRB.

Step 1410: The S-gNB transmits a handover command message to a UE.

In downlink, the source base station performs data forwarding according to the received data forwarding tunnel information. The source base station can perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is corresponding to each Qos flow, each DRB or each PDU session. The data forwarding can be direct data forwarding or indirect data forwarding. For the direct data forwarding, data not acknowledged by a UE and/or data allocated with a PDCP SN can be forwarded through a tunnel for each DRB. Corresponding fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the indirect data forwarding, the data forwarded by the tunnel corresponding to each PDU session can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session. The data forwarding can be direct data forwarding or indirect data forwarding.

Step 1411: The UE transmits a handover completion message to the T-gNB.

Step 1412: The T-gNB transmits a handover notification message to the AMF.

Step 1413: The AMF transmits an N11 message to the SMF. An interface between the AMF and the SMF is N11. This message contains the PDU session identifier. This message is specific to each PDU session.

Step 1414: The SMF transmits a session modification request message to an UPF.

Step 1415: The UPF transmits a session modification response message to the SMF.

Step 1416: The SMF transmits an N11 acknowledgement message to the AMF.

Step 1417: The AMF transmits a UE context release command message to the S-gNB.

Step 1418: The S-gNB transmits a UE context release completion message to the AMF.

So far, the sixth method of the present invention has been described. By the method in this embodiment, different data forwarding methods can be supported, the loss of data can be avoided and the continuity of services can be ensured. For the handover in a 5G system, if a source base station transmits PDU session information of UE to an AMF, in the handover preparation stage, the AMF does not need to interact with an SMF to obtain the PDU session information of the UE, so that the handover delay is reduced.

Figure 15:
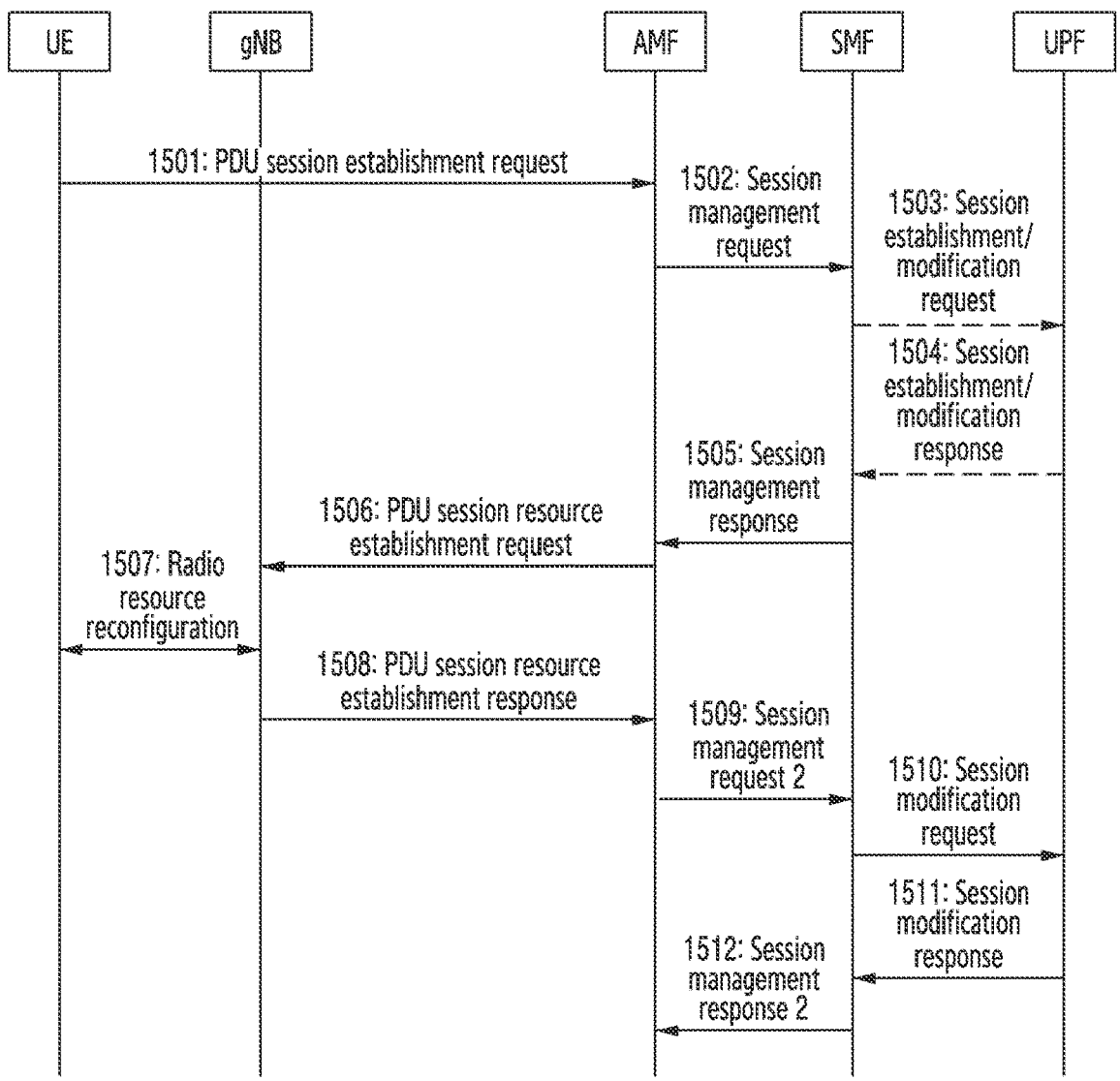
FIG. 15 is a schematic diagram of a method for supporting handover PDU session establishment according to the present invention.

FIG. 15 shows a method of PDU session establishment for supporting handover according to the present invention. This embodiment will be described by taking a base station being a gNB as example. Actually, this embodiment is also suitable for a situation where the base station is an eNB connected to a 5GC, and a base station connected to a 5GC may also be an ng-eNB. Here, the detailed description of steps irrelevant to the present invention has been omitted. In this method of the present invention, the function partition of an AMF and an SMF is still kept. The SMF is responsible for session management. The AMF can store the received PDU session information. This method comprises the following steps:

Step 1501: A UE transmits a Non-Access Stratum (NAS) message to an AMF to request to establish a PDU session. The NAS message contains Single-Network Slice Selection Assistance Information (S-NSSAI), a Data Network Name (DNN), a PDU session identifier, a request type and N1 SM information. The N1 SM information contains a PDU session establishment request.

Step 1502: The AMF selects an SMF. The AMF stores the PDU session identifier and an SMF identifier. The AMF transmits a Session Management (SM) request message to the SMF. This message contains N1 SM information. The N1 SM information contains the PDU session identifier, and the PDU session establishment request received from the UE.

Here, the authorization data process to the unified data management, the PDU session authorization and authentication process and the process to the Packet Control Function (PCF) will not be described in detail.

The SMF selects an UPF.

Step 1503: If the request is an initial request and the PDU session authorization and authentication process is not performed, the SMF initiates a session establishment process with the UPF. Otherwise, a session modification process will be initiated. The SMF transmits a session establishment request message or a session modification request message to the UPF.

Step 1504: The UPF transmits a session establishment response message or a session modification response message to the SMF.

Step 1505: The SMF transmits an SM response message to the AMF. This message contains N2 SM information and N1 SM information. The N2 SM information contains the PDU session identifier, Qos information and NG interface uplink tunnel information allocated by the core network. The Qos information provides a mapping relationship between Qos parameters and Qosflow identifiers. The N2 interface in the present invention is a control plane interface between the AMF and the NG-RAN, i.e., an NG-C. The N2 SM information is the same as the NG-C SM information.

The AMF stores the N2 SM information of the PDU session.

Step 1506: The AMF transmits a PDU session resource establishment request message to a gNB. This message contains the N2 SM information and the NAS message.

Step 1507: The gNB triggers a radio resource reconfiguration process with the UE. The gNB allocates NG interface downlink user plane tunnel information. The gNB transmits the NAS message to the UE. The UE transmits a response message to the gNB.

Step 1508: The gNB transmits a PDU session resource establishment response message to the AMF. This message contains the PDU session identifier and the N2 SM information. The N2 SM information contains the PDU session identifier, the tunnel information allocated by the gNB, the accepted Qos information and/or the rejected Qos flow information. The AMF stores the received N2 SM information.

Step 1509: The AMF transmits an SM request 2 to the SMF. This message contains the N2 SM information received from the gNB.

Step 1510: The SMF transmits a session modification request message to an UPF. If the corresponding PDU has not been established in the UPF, the message is a session establishment request message. The SMF transmits tunnel information of an access network to the UPF. The tunnel information of the access network is downlink tunnel information allocated by the gNB.

Step 1511: The UPF transmits a session modification response to the SMF. If the session establishment request is received in the step 1010, this process is a session establishment response.

Step 1512: The SMF transmits an SM response 2 message to the AMF.

So far, the PDU session establishment process in the method for supporting handover of the present invention has been described. By the method in this embodiment, since the information of a PDU session established by the UE is stored in the AMF, in the handover preparation stage, the AMF does not need to interact with the SMF to obtain the PDU session information of the UE, so that the handover delay is reduced.

Figure 16:
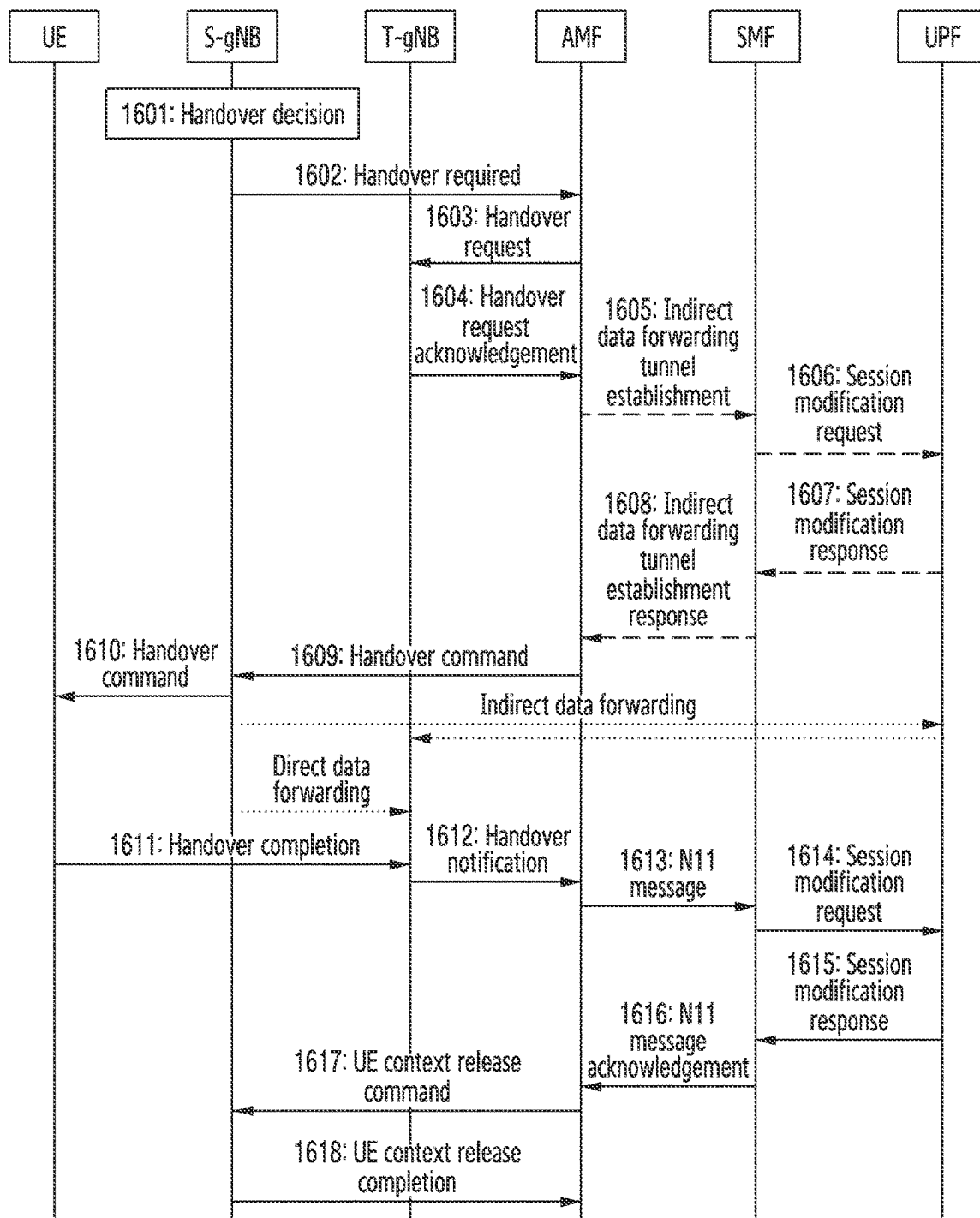
FIG. 16 is a schematic diagram of a seventh method for supporting handover according to the present invention.

FIG. 16 shows a schematic diagram of a seventh method of the present invention. This embodiment will be described by taking both a source base station and a target base station being gNBs as example. Actually, this method is also suitable for a situation where the source base station is an eNB connected to the 5GC or the target base station is an eNB connected to the 5GC, and a base station connected to a 5GC may also be an ng-eNB. Here, the detailed description of steps irrelevant to the present invention has been omitted. This method comprises the following steps:

Step 1601: A source gNB (S-gNB) decides to initiate a handover to a UE.

Step 1602: The S-gNB transmits a handover required message to an AMF.

The source base station proposes downlink data forwarding. The downlink data forwarding proposed by the source base station is specific to a PDU session, and/or a Qos flow in a PDU session, and/or a DRB in a PDU session.

The message contains information about whether the direct data forwarding path is available. When the direct data forwarding path is available, the S-gNB can contain information indicating that the direct data forwarding path is available. Through the absence of the direct data forwarding path information element, the AMF knows that the direct data forwarding path is not available. The source base station can decide, based on the presence or absence of an Xn interface between the source base station and a target base station, whether the direct data forwarding path is available. Without influencing the main contents of the present invention, the source base station can also decide whether to perform direct data forwarding by considering other factors, for example, by considering the presence or absence of an IP connection between the source base station and the target base station.

In a source-to-target transparent container or in a handover required message, the source base station contains PDU session information requiring data forwarding and/or Qos flow information requiring data forwarding. The PDU session information contains a PDU session identifier and/or the downlink data forwarding proposed by the source base station. The Qos flow information contains a Qos flow identifier and/or the downlink data forwarding proposed by the source base station. A mapping relationship from the Qos flow in the PDU session to the DRB and/or DRB configuration information can further be contained in the source-to-target transparent container. DRB information requiring data forwarding can further be contained in the source-to-target transparent container. The DRB information contains a DRB identifier and/or the downlink data forwarding proposed by the source base station. The source base station can contain the DRB information requiring data forwarding only when the direct data forwarding path is available. The mapping relationship from the Qos flow in the PDU session to the DRB, the DRB configuration information and/or the DRB information requiring data forwarding can also be contained in the handover required message.

The handover required message contains an identifier of a target base station. The handover required message can further contain an identifier of a target cell and a Tracking Area Identifier (TAI) of the target cell.

The S-gNB decides whether the target base station is connected to a 5GC base station or connected to an Evolved Partition Core Network (EPC). If the target base station is an LTE eNB, the eNB can be connected to an EPC or a 5GC.

The source base station can know, by the following ways, whether the eNB supports an interface to the 5GC.

Way 1: The eNB broadcasts whether it supports an interface to the 5GC. A UE reads the broadcast information of the eNB, and transmits, to a serving base station (e.g., a gNB) of the UE, information indicating whether a neighboring base station supports the interface to the 5GC.

Way 2: Through the establishment process of an interface between a gNB and an eNB, the eNB informs the gNB whether it supports an interface to the 5G core network.

Way 3: Through an O&M configuration, a gNB knows whether an eNB supports an interface to the 5G core network.

The gNB informs the AMF of a handover type. The handover type includes a handover inside NR, a handover from NR to LTE, a handover from NR to UTRAN and a handover from NR to GERAN and/or GSM. For the handover from NR to LTE, a 5G-RAN informs a 5GC CP whether the handed-over target base station is a base station connected to the 5G core network or whether this handover is a handover between different systems. An LTE eNB may support an interface to the 5GC, or may not support an interface to the 5GC. If the target base station is also connected to the 5GC, the handover is a handover inside the 5G system. If the target base station is connected to the EPC but not connected to the 5GC, the handover is a handover between different systems. The gNB can inform the AMF that this handover is a handover between different systems through information about an inter-system handover or information indicating that there is no interface between the target base station and the 5GC, which being in the handover required message. If an identifier of an eNB connected to the 5GC and an identifier of an eNB not connected to the 5GC are different in length, the AMF can determine, according to the length of the identifier of the target base station contained in the received handover required message, whether the handover is a handover between different systems. Or, the gNB sets the handover type in the handover required message as a handover from the NR to an eNB connected to the EPC or a handover from the NR to an eNB connected to the 5GC, so as to inform the AMF of the handover type. The handover type indicates the core network to which the target eNB is connected is an EPC or a 5GC. If the core network is a 5GC, the handover is an intra-system handover. If the core network is an EPC, the handover is a handover between different systems.

Step 1603: The AMF transmits a handover request message to a target gNB (T-gNB). This message contains a source-to-target transparent container. This message contains a list of PDU session information. The AMF knows the PDU session information of the UE according to the N2 SM information stored during the PDU session establishment process. The PDU session information is the same as that in the step 1402 and will not be repeated in detail herein.

The AMF decides whether to use direct data forwarding or indirect data forwarding. The AMF decides, according to the information indicating whether the direct data forwarding path is available received from the S-gNB, whether to use direct data forwarding or indirect data forwarding. The AMF can also decide, by considering other factors, whether to use direct data forwarding or indirect data forwarding, without influencing the main contents of the present invention. The AMF decides whether the data forwarding is possible. The infeasibility of the data forwarding can be specific to each PDU session. For a handover between different AMFs, if a source AMF decides to use direct data forwarding, the source AMF informs a target AMF of information about the direct data forwarding. The source AMF informs the target AMF of information indicating whether the data forwarding is possible.

This handover request message contains the direct data forwarding or indirect data forwarding. The AMF can inform the target base station of the direct data forwarding when the direct data forwarding is used. When there is no direct data forwarding in the handover request message, the target base station knows that the direct data forwarding is impossible. This message contains information indicating that the data forwarding is impossible. The infeasibility of the data forwarding can be specific to each PDU session. If this message contains the direct data forwarding or indirect data forwarding or absence of information element indicating that the data forwarding is impossible, it is indicated that the data forwarding is possible. For a certain PDU session, if there is no any information element indicating that the data forwarding is impossible, it is indicated that the data forwarding for the PDU session is possible. The handover request message contains a source-to-target transparent container. The information contained in the source-to-target transparent container is the same as that in the step 801 and will not be repeated in detail herein.

A specific method for allocating data forwarding tunnels by the T-gNB is the same as that in the step 804 and will not be repeated in detail herein. A specific method for proposing, by the T-gNB, uplink data forwarding and allocating uplink data forwarding tunnels is the same as that in the step 804 and will not be repeated here.

The target base station decides whether to use the same DRB configuration and the same mapping from the Qos flow to the DRB as the source base station, or use a full configuration.

The target base station informs the source base station of information indicating whether the same DRB configuration and the same mapping from the Qos flow to the DRB as the source base station are used, or the full configuration is used. The target base station can transmit the information to the source base station through a target-to-source transparent container. Or, the target base station transmits the information to the source base station through the handover request acknowledgement message in the step 907 and the handover command message in the step 912.

Step 1604: The T-gNB transmits a handover request acknowledgement message to the AMF. This message contains the data forwarding tunnel information allocated by the target base station. This message contains a target-to-source transparent container. This message contains a list of established PDU sessions and/or a list of unsuccessfully established PDU sessions. For an established PDU session, this message contains successfully established Qos flows and unsuccessfully established Qos flows. For different data forwarding methods in the step 704, the data forwarding tunnel information can be specific to each PDU session, each Qos flow and/or each DRB. The data forwarding tunnel information can be contained in a target-to-source transparent container and/or a handover request acknowledgement message. Preferably, the data forwarding tunnel information corresponding to the DRB can be contained in the target-to-source transparent container.

If the source base station proposes data forwarding for a Qos flow in a PDU session, and if the Qos flow is successfully established and the target base station accepts data forwarding for the Qos flow(s), the target base station may allocate data forwarding tunnel information for the PDU session to which the Qos flow belongs. For a Qos flow or Qos flows that the target base station accepts the data forwarding, the target base station transmits the indication information of accepting the data forwarding to the source base station, so that the source base station knows which Qos flow or Qos flows in the PDU session is accepted for data forwarding by the target base station. The target base station transmits the tunnel information allocated for the corresponding PDU session to the source base station.

If the source base station proposes the data forwarding for a DRB in a PDU session, and if the DRB is successfully established, the target base station may also allocate user plane tunnel information including the address of a transport layer and TEID to each DRB that requires data forwarding. The source base station can know that the target base station has accepted the data forwarding for the DRB, through the user plane tunnel information corresponding to the DRB. If the source base station proposes the data forwarding for a DRB in a PDU session, and if the DRB is successfully established and the target base station accepts the data forwarding for the DRB, the target base station allocates data forwarding tunnel information to the PDU session to which the DRB belongs. For the DRB or DRBs that the target base station accepts the data forwarding, the target base station transmits the indication information of accepting the data forwarding to the source base station, so that the source base station knows which DRB or DRBs in the PDU session is accepted for data forwarding by the target base station. The target base station transmits tunnel information allocated for the corresponding PDU session to the source base station.

The target base station proposes uplink data forwarding. The target base station proposes UL data forwarding for per PDU session, and/or per Qos flow and/or per DRB. The handover request acknowledgement message contains PDU session information, Qos flow information and/or DRB information proposed for data forwarding by the target base station. If the target base station proposes uplink data forwarding for a PDU session, the target base station allocates PDU-level tunnel information to the PDU session. If the target base station proposes uplink data forwarding for a Qos flow, the target base station may allocate Qos flow-level tunnel information or PDU session-level tunnel information, and for the PDU session-level tunnel information, the target base station contains an identifier of the Qos flow proposing uplink data forwarding in the handover request acknowledgement message. If the target base station proposes uplink data forwarding for a DRB, the target base station may allocate DRB-level tunnel information or PDU session-level tunnel information, and for the PDU session-level tunnel information, target base station contains an identifier of the DRB proposing uplink data forwarding in the handover request acknowledgement message. The specific method is the same as describe in step 804 and will not be described in detail herein.

Step 1605: The AMF transmits an indirect data forwarding tunnel establishment message to an SMF. The SMF is a temporary SMF selected for performing data forwarding, a certain SMF serving the UE, or an SMF corresponding to each PDU session requiring data forwarding. The indirect data forwarding tunnel establishment message contains the PDU session information that the data forwarding is accepted by the target base station The PDU session information contains the PDU session identifier, the downlink data forwarding tunnel information allocated by the target base station and/or the tunnel information of the uplink data forwarding proposed by the target base station. The PDU session information can further contain Qos flow information accepted by the target base station and/or failed Qos flow information in the PDU session. The accepted Qos flow information contains the Qos flow identifier, the downlink data forwarding tunnel information allocated to the Qos flow by the target base station and/or the tunnel information allocated to the Qos flow during the uplink data forwarding proposed by the target base station. During the indirect data forwarding, for the PDU session accepted by the target base station, if at least one accepted Qos flow requires data forwarding, the AMF requests the SMF to establish indirect data forwarding tunnel.

The steps 1605 to 1608 are executed only during the indirect data forwarding. For the direct data forwarding, the AMF will transmit, in the step 1609 and to the source base station, the data forwarding tunnel information received from the target base station.

Step 1606: The SMF transmits a session modification request message to an UPF. The SMF transmits, to the UPF, the indirect data forwarding tunnel information allocated by the T-gNB, and requests the UPF to allocate tunnel information used for data forwarding from the S-gNB to the UPF. This message can also be a session establishment request message between the SMF and the UPF. The UPF is a temporary UPF selected for performing data forwarding, a certain UPF serving the UE, or an UPF corresponding to each PDU session requiring data forwarding. For the UPF corresponding to each PDU session requiring data forwarding, the UPF can be a source UPF or a target UPF, and the target UPF is specific to a situation that the UPF is repositioned. If the UPF is a temporary UPF selected for performing data forwarding, the SMF selects an UPF having an interface to the target gNB.

Step 1607: The UPF transmits a session modification response message to the SMF. This message can also be a session establishment response message between the SMF and the UPF. This message contains the data forwarding tunnel information from the S-gNB to the UPF allocated by the UPF. The tunnel information contains a tunnel identifier and an address of a transport layer. The tunnel information can be specific to each PDU session and/or each Qos flow in each PDU session. The tunnel information can also be specific to a DRB.

Step 1608: The SMF transmits an indirect data forwarding tunnel establishment response message to the AMF. This message contains a PDU session identifier and information of Session Management (SM) at an NG-C interface. This message contains the data forwarding tunnel information from the S-gNB to the UPF allocated by the UPF.

Step 1609: The AMF transmits a handover command message to the S-gNB. This message contains a target-to-source transparent container. For the indirect data forwarding, the AMF transmits, to the source base station, the data forwarding tunnel information allocated by an UPF. If the UPF changes during a handover process, the AMF transmits, to the source base station, the data forwarding tunnel information allocated by the source UPF. For a successfully established Qos flow, the message may also contain an indication that the target base station has accepted data forwarding for the Qos flow. For a successfully established DRB, the message may also contain an indication that the target base station has accepted data forwarding for the DRB. The message also contains Qos flow information that the target base station proposes uplink data forwarding or DRB information that the target base station proposes uplink data forwarding or PDU session information proposed for uplink data forwarding by the target base station. The information may be tunnel identifier information allocated for data forwarding or uplink data forwarding proposal information corresponding to a Qos flow or DRB.

Step 1610: The S-gNB transmits a handover command message to a UE.

In downlink, the source base station performs data forwarding according to the received data forwarding tunnel information. The source base station can perform data forwarding according to the received indication information of data forwarding accepted for a Qos flow and/or indication information of data forwarding accepted for a DRB, and perform data forwarding on the data of the Qos flow or DRB on a corresponding data forwarding tunnel. The data forwarding tunnel is corresponding to each Qos flow, each DRB or each PDU session. The data forwarding can be direct data forwarding or indirect data forwarding. For the direct data forwarding, data not acknowledged by a UE and/or data allocated with a PDCP SN can be forwarded through a tunnel for each DRB. Corresponding fresh data can be forwarded by a tunnel corresponding to each PDU session. The forwarded data can be a GTP-U data packet, an SDAP data packet or a PDCP data packet. The PDCP data packet can be a data packet containing a PDCP SN or a data packet containing no PDCP SN. For the indirect data forwarding, the data forwarded by the tunnel corresponding to each PDU session can be a GTP-U data packet, an SDAP data packet or a PDCP data packet. The PDCP data packet can be a data packet containing a PDCP SN or a data packet containing no PDCP SN. For the direct data forwarding or indirect data forwarding, data can also be transmitted to the target base station through a tunnel corresponding to each Qos flow.

If the target base station uses the full configuration, the source base station forwards only fresh data to the target base station. If the target base station uses the same DRB configuration and the same mapping from the Qos flow to the DRB as the source base station, the source base station forwards, to the target base station, data not acknowledged by the UE, data not transmitted to the UE and/or fresh data.

In uplink, if the source base station accepts the data forwarding proposed by the target base station, the source base station performs data forwarding according to the received data forwarding tunnel information. The source base station can perform data forwarding on the data of a Qos flow or DRB on a corresponding data forwarding tunnel, if the source base station accepts the uplink data forwarding, according to a Qos flow, DRB or PDU information proposed for data forwarding by the target base station. The data forwarding tunnel information can be per Qos flow, per DRB or per PDU session. The data forwarding can be direct data forwarding or indirect data forwarding.

Step 1611: The UE transmits a handover completion message to the T-gNB.

Step 1612: The T-gNB transmits a handover notification message to the AMF.

Step 1613: The AMF transmits an N11 message to the SMF. An interface between the AMF and the SMF is N11. This message contains the PDU session identifier. This message is specific to each PDU session.

Step 1614: The SMF transmits a session modification request message to an UPF.

Step 1615: The UPF transmits a session modification response message to the SMF.

Step 1616: The SMF transmits an N11 acknowledgement message to the AMF.

Step 1617: The AMF transmits a UE context release command message to the S-gNB.

Step 1618: The S-gNB transmits a UE context release completion message to the AMF.

So far, the seven method of the present invention has been described. By the method in this embodiment, different data forwarding methods can be supported, the loss of data can be avoided and the continuity of services can be ensured. If an AMF transmits, according to the stored N2 SM information, the PDU session information of a UE to a target base station, the AMF does not need to interact with an SMF to obtain the PDU session information of the UE, so that the handover delay is reduced, in the handover preparation stage.

By the method for supporting handover of the present invention, different data forwarding methods are supported, the loss of data is avoided, and the continuity of services is ensured. The forgoing description merely shows preferred embodiments of the present invention and is not intended to limit the present invention. Any modification, equivalent replacement or improvement made within the spirit and principle of the present invention shall fall into the protection scope of the present invention.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by an access control and mobility management function (AMF) in a wireless communication system, the method comprising:
   receiving, from a source radio access network (RAN) node, a handover required message for a handover from the source RAN node to a target RAN node including a source-to-target transparent container, wherein the source-to-target transparent container includes protocol data unit (PDU) session information; and
   transmitting, to the source RAN node, a handover command message,
   wherein the PDU session information includes:
      an identifier of a PDU session, and
      information on one or more quality of service (QOS) flows, and
   wherein the handover command message includes information on at least one QoS flow.

2. The method of claim 1, wherein the handover required message further includes information indicating whether a direct forwarding between the source RAN node and the target RAN node is available or not.

3. The method of claim 1, further comprising:
   transmitting, to the target RAN node, a handover request message including the source-to-target transparent container; and
   receiving, from the target RAN node, a handover request acknowledge message including the information on the at least one QoS flow and a forwarding tunnel information for the PDU session,
   wherein data forwarding associated with the at least one QoS flow is accepted by the target RAN node.

4. The method of claim 3, wherein the handover request message includes information indicating whether a direct forwarding between the source RAN node and the target RAN node is available or not.

5. The method of claim 3, wherein the handover request acknowledge message includes information indicating whether the target RAN determines to use same data radio bearer (DRB) configuration and to use same QoS flows as the source RAN.

6. The method of claim 4, wherein, in case of an indirect data forwarding, the forwarding tunnel information comprises tunnel information allocated by a user plane function, UPF.

7. The method of claim 1,
   wherein the information on the at least one QoS flow includes information regarding the PDU session and forwarding tunnel information.

8. The method of claim 7, wherein, in case of a direct data forwarding, the forwarding tunnel information comprises data forwarding tunnel information received by the target RAN node.

9. The method of claim 2, wherein the information indicating whether a direct forwarding between the source RAN node and the target RAN node is available or not is indicated based on a presence of internet protocol, IP, connectivity.

10. The method of claim 1,
    wherein data forwarding for the at least one QoS flow is performed based on a forwarding tunnel information, and
    wherein the forwarding tunnel information includes an address of a transport layer and a tunnel endpoint ID (TEID).

11. An apparatus of an access control and mobility management function (AMF) in a wireless communication system, the AMF comprising:
    a transceiver; and
    at least one processor coupled to the transceiver and configured to:
       receive, from a source radio access network (RAN) node, a handover required message for a handover from the source RAN node to a target RAN node including a source-to-target transparent container, wherein the source-to-target transparent container includes protocol data unit (PDU) session information, and
       transmit, to the source RAN node, a handover command message,
    wherein the PDU session information includes:
       an identifier of a PDU session, and
       information on one or more quality of service (QOS) flows, and
    wherein the handover command message includes information on at least one QoS flow.

12. The apparatus of claim 11, wherein the handover required message further includes information indicating whether a direct forwarding between the source RAN node and the target RAN node is available or not.

13. The apparatus of claim 11, wherein the at least one processor is further configured to:
    transmit, to the target RAN node, a handover request message including the source-to-target transparent container, and
    receive, from the target RAN node, a handover request acknowledge message including the information on the at least one QoS flow and a forwarding tunnel information for the PDU session,
    wherein data forwarding associated with the at least one QoS flow is accepted by the target RAN node.

14. The apparatus of claim 13, wherein the handover request message includes information indicating whether a direct forwarding between the source RAN node and the target RAN node is available or not.

15. The apparatus of claim 13, wherein the handover request acknowledge message includes information indicating whether the target RAN determines to use same data radio bearer (DRB) configuration and to use same QoS flows as the source RAN.

16. The apparatus of claim 14, wherein, in case of an indirect data forwarding, the forwarding tunnel information comprises tunnel information allocated by a user plane function, UPF.

17. The apparatus of claim 11,
    wherein the information on at least one QoS flow includes information regarding the PDU session and forwarding tunnel information.

18. The apparatus of claim 17, wherein, in case of a direct data forwarding, the forwarding tunnel information comprises data forwarding tunnel information received by the target RAN node.

19. The apparatus of claim 12, wherein the information indicating whether a direct forwarding between the source RAN node and the target RAN node is available or not is indicated based on a presence of internet protocol, IP, connectivity.

20. The apparatus of claim 11,
    wherein data forwarding for the at least one QoS flow is performed based on a forwarding tunnel information, and wherein the forwarding tunnel information includes an address of a transport layer and a tunnel endpoint ID (TEID).

\* \* \* \* \*